United States Patent
Freeman et al.

(10) Patent No.: US 7,448,063 B2
(45) Date of Patent: *Nov. 4, 2008

(54) DIGITAL INTERACTIVE SYSTEM FOR PROVIDING FULL INTERACTIVITY WITH LIVE PROGRAMMING EVENTS

(75) Inventors: Michael J. Freeman, Kings Point, NY (US); Craig Ullman, Brooklyn, NY (US)

(73) Assignee: ACTV, Inc., San Francisco, CA (US)

( * ) Notice: Subject to any disclaimer, the term of this patent is extended or adjusted under 35 U.S.C. 154(b) by 1057 days.

This patent is subject to a terminal disclaimer.

(21) Appl. No.: 10/126,480

(22) Filed: Apr. 19, 2002

(65) Prior Publication Data

US 2002/0188943 A1    Dec. 12, 2002

Related U.S. Application Data

(63) Continuation of application No. 08/815,168, filed on Mar. 11, 1997, now abandoned, which is a continuation-in-part of application No. 08/598,382, filed on Feb. 8, 1996, now Pat. No. 5,861,881, which is a continuation-in-part of application No. 08/443,607, filed on May 18, 1995, now Pat. No. 5,724,091, which is a continuation-in-part of application No. 08/166,608, filed on Dec. 13, 1993, now abandoned, which is a continuation of application No. 07/797,298, filed on Nov. 25, 1991, now abandoned.

(51) Int. Cl.
*H04N 7/16* (2006.01)
*H04N 7/18* (2006.01)
*H04N 5/225* (2006.01)

(52) U.S. Cl. ............... 725/136; 348/157; 348/207.1

(58) Field of Classification Search .............. 725/32, 725/91, 110, 136; 348/157, 207.1
See application file for complete search history.

(56) References Cited

U.S. PATENT DOCUMENTS 2,612,553 A    9/1952    Homrighous (Continued)

FOREIGN PATENT DOCUMENTS

AU    717399    8/1997

(Continued)

OTHER PUBLICATIONS

Beaudin S., The Web is Not TV, Or is it? http://www.lcc.gatech.edu/gallery/dzine/webtv; copyright 1996.

(Continued)

*Primary Examiner*—Chris Kelley
*Assistant Examiner*—James Sheleheda
(74) *Attorney, Agent, or Firm*—Schwegman, Lundberg & Woessner P.A.

(57) ABSTRACT

The present invention relates to an interactive digital system enabling viewers full and active participation in experiencing a live broadcast event. Particularly, the presentation of the live event is personalized for the viewer through the provision of various options, including multiple video streams, associated with different c125 amera angles, for example, and integrated audio and graphics segments. Further, information obtained from related Web sites can be integrated into the live program. Various video and audio streams are collected from a live event and forwarded to a central control studio. Graphics are created at the central studio on a personal computer or chyron device. After receiving the video, audio and graphics signals, the signals are digitized and compressed in digital compressors. These signals are then combined with special data codes into a "digital package," and subsequently, transmitted over a cable distribution system. Once received at a viewer home, the signals are received and processed in an interactive digital cable box. Selections of the video, audio, graphics displays and/or Web pages can be made as a function of immediate viewer entries, or to interrogatory responses presented at the beginning or during the program, or based on a prestored viewer profile. Once a decision is made to switch from one video to another video option, the digital switch is performed seamlessly. The digital interactive system is based upon seamless branches which occur in the course of full-motion video.

45 Claims, 7 Drawing Sheets

U.S. PATENT DOCUMENTS

| | | |
|---|---|---|
| 2,777,901 A | 1/1957 | Dostert |
| 2,826,828 A | 3/1958 | Hamilton |
| 2,908,767 A | 10/1959 | Fritzinger |
| 2,921,385 A | 1/1960 | Hamilton |
| 3,008,000 A | 11/1961 | Morchand |
| 3,020,360 A | 2/1962 | Gratian et al. |
| 3,194,895 A | 7/1965 | Treadweli |
| 3,221,098 A | 11/1965 | Feldman et al. |
| 3,245,157 A | 4/1966 | Laviana |
| 3,255,536 A | 6/1966 | Livingston |
| 3,273,260 A | 9/1966 | Walker |
| 3,284,923 A | 11/1966 | Leslie |
| 3,343,280 A | 9/1967 | Tolnai |
| 3,366,731 A | 1/1968 | Wallerstein |
| 3,387,084 A | 6/1968 | Hine et al. |
| 3,440,342 A | 4/1969 | Beltrami |
| 3,477,144 A | 11/1969 | Stillit |
| 3,484,950 A | 12/1969 | Serrell et al. |
| 3,485,946 A | 12/1969 | Jackson et al. |
| 3,538,621 A | 11/1970 | Mayeda |
| 3,546,791 A | 12/1970 | Koos et al. |
| 3,566,482 A | 3/1971 | Morchand |
| 3,575,861 A | 4/1971 | Pratt et al. |
| 3,602,582 A | 8/1971 | Torricelli |
| 3,623,238 A | 11/1971 | LaPlume et al. |
| 3,643,217 A | 2/1972 | Morphew et al. |
| 3,665,615 A | 5/1972 | LaPlume |
| 3,708,891 A | 1/1973 | Rosov |
| 3,725,571 A | 4/1973 | Justice |
| 3,730,980 A | 5/1973 | Kirk, Jr. |
| 3,757,225 A | 9/1973 | Ulicki |
| 3,763,377 A | 10/1973 | Weston |
| 3,763,577 A | 10/1973 | Goodson |
| 3,774,316 A | 11/1973 | Meier |
| 3,814,841 A | 6/1974 | Ulicki |
| 3,825,674 A | 7/1974 | Justice |
| 3,833,760 A | 9/1974 | Tickle |
| 3,849,594 A | 11/1974 | Justice |
| 3,857,999 A | 12/1974 | Justice |
| 3,860,745 A | 1/1975 | Takada |
| 3,902,007 A | 8/1975 | Justice |
| 3,916,092 A | 10/1975 | Justice |
| 3,936,595 A | 2/1976 | Yanagimachi et al. |
| 3,947,972 A | 4/1976 | Freeman |
| 3,988,528 A | 10/1976 | Yanagimachi et al. |
| 3,991,266 A | 11/1976 | Baer |
| 4,034,990 A | 7/1977 | Baer |
| 4,040,088 A | 8/1977 | Hannan |
| 4,044,380 A | 8/1977 | Justice et al. |
| 4,078,316 A | 3/1978 | Freeman |
| 4,199,781 A | 4/1980 | Doumit |
| 4,245,245 A | 1/1981 | Matsumoto et al. |
| 4,264,924 A | 4/1981 | Freeman |
| 4,264,925 A | 4/1981 | Freeman et al. |
| 4,290,142 A | 9/1981 | Schnee et al. |
| 4,292,649 A | 9/1981 | Macheboeuf |
| 4,305,131 A | 12/1981 | Best |
| 4,331,974 A | 5/1982 | Cogswell et al. |
| 4,333,152 A | 6/1982 | Best |
| 4,361,730 A | 11/1982 | Barber et al. |
| 4,381,522 A | 4/1983 | Lambert |
| 4,399,329 A | 8/1983 | Wharton |
| 4,422,105 A | 12/1983 | Rodesch et al. |
| 4,439,784 A | 3/1984 | Furukawa et al. |
| 4,445,137 A | 4/1984 | Panofsky |
| 4,445,187 A | 4/1984 | Best |
| 4,507,680 A | 3/1985 | Freeman .................... 725/139 |
| 4,516,156 A | 5/1985 | Fabris et al. |
| 4,530,008 A | 7/1985 | McVoy |
| 4,536,791 A | 8/1985 | Campbell et al. |
| 4,546,382 A | 10/1985 | McKenna et al. |
| 4,555,730 A | 11/1985 | Briggs |
| 4,569,026 A | 2/1986 | Best |
| 4,571,640 A | 2/1986 | Baer |
| 4,572,509 A | 2/1986 | Sitrick |
| 4,573,072 A | 2/1986 | Freeman |
| 4,574,305 A | 3/1986 | Campbell et al. |
| 4,591,248 A | 5/1986 | Freeman |
| 4,592,546 A | 6/1986 | Fascenda et al. |
| 4,599,611 A | 7/1986 | Bowker et al. |
| 4,602,279 A | 7/1986 | Freeman |
| 4,616,261 A | 10/1986 | Crawford et al. |
| 4,625,235 A | 11/1986 | Watson |
| 4,635,132 A | 1/1987 | Nakamura |
| 4,644,515 A | 2/1987 | Allebest et al. |
| 4,647,980 A | 3/1987 | Steventon et al. |
| 4,665,431 A | 5/1987 | Cooper |
| 4,694,490 A | 9/1987 | Harvey et al. |
| 4,701,896 A | 10/1987 | Allebest et al. |
| 4,704,725 A | 11/1987 | Harvey et al. |
| 4,706,121 A | 11/1987 | Young et al. |
| 4,730,188 A | 3/1988 | Milheiser |
| 4,733,301 A | 3/1988 | Wright, Jr. |
| 4,734,764 A | 3/1988 | Pocock et al. |
| 4,750,036 A | 6/1988 | Martinez |
| 4,763,317 A | 8/1988 | Lehman et al. |
| 4,768,087 A | 8/1988 | Taub et al. |
| 4,777,529 A | 10/1988 | Schultz |
| 4,780,757 A | 10/1988 | Bryer et al. |
| 4,780,758 A | 10/1988 | Lin et al. |
| RE32,776 E | 11/1988 | Saylor |
| 4,785,349 A | 11/1988 | Keith et al. |
| 4,786,967 A | 11/1988 | Smith, III et al. |
| 4,807,031 A | 2/1989 | Broughton et al. |
| 4,816,905 A | 3/1989 | Tweedy et al. |
| 4,821,101 A | 4/1989 | Short |
| 4,839,743 A | 6/1989 | Best et al. |
| 4,846,693 A | 7/1989 | Baer |
| 4,847,690 A | 7/1989 | Perkins |
| 4,847,698 A | 7/1989 | Freeman |
| 4,847,699 A | 7/1989 | Freeman |
| 4,847,700 A | 7/1989 | Freeman |
| 4,855,827 A | 8/1989 | Best |
| 4,862,268 A | 8/1989 | Campbell et al. |
| 4,870,591 A | 9/1989 | Cicciarelli et al. |
| 4,875,096 A | 10/1989 | Baer et al. |
| 4,876,592 A | 10/1989 | Von Kohorn |
| 4,877,408 A | 10/1989 | Hartsfield |
| 4,884,974 A | 12/1989 | Desmet |
| 4,894,789 A | 1/1990 | Yee |
| 4,905,094 A | 2/1990 | Pocock et al. |
| 4,916,633 A | 4/1990 | Tychonievich et al. |
| 4,918,516 A | 4/1990 | Freeman |
| 4,918,620 A | 4/1990 | Ulug |
| 4,924,303 A | 5/1990 | Brandon et al. |
| 4,926,255 A | 5/1990 | Von Kohorn |
| 4,930,019 A | 5/1990 | Chu |
| 4,931,865 A | 6/1990 | Scarampi |
| 4,941,040 A | 7/1990 | Pocock et al. |
| 4,949,170 A | 8/1990 | Yanagidaira et al. |
| 4,965,825 A | 10/1990 | Harvey et al. |
| 4,967,368 A | 10/1990 | Bolling et al. |
| 4,972,328 A | 11/1990 | Wu et al. |
| 4,975,771 A | 12/1990 | Kassatly |
| 4,987,486 A | 1/1991 | Johnson et al. |
| 4,988,111 A | 1/1991 | Gerlitz et al. |
| 4,989,233 A | 1/1991 | Schahowsky et al. |
| 4,989,234 A | 1/1991 | Schahowsky et al. |
| 4,991,011 A | 2/1991 | Johnson et al. |
| 4,994,908 A | 2/1991 | Kuban et al. |
| 4,995,036 A | 2/1991 | Copen et al. |
| 5,001,554 A | 3/1991 | Johnson et al. |
| 5,010,400 A | 4/1991 | Oto |
| 5,010,500 A | 4/1991 | Makkuni et al. |

| | | |
|---|---|---|
| 5,014,125 A | 5/1991 | Pocock et al. |
| 5,023,707 A | 6/1991 | Briggs |
| 5,027,400 A | 6/1991 | Baji et al. .................. 380/20 |
| 5,033,969 A | 7/1991 | Kamimura |
| 5,034,807 A | 7/1991 | Von Kohorn |
| 5,043,891 A | 8/1991 | Goldstein et al. |
| 5,051,822 A | 9/1991 | Rhoades |
| 5,053,883 A | 10/1991 | Johnson |
| 5,055,924 A | 10/1991 | Skutta |
| 5,057,915 A | 10/1991 | Von Kohorn |
| 5,068,733 A | 11/1991 | Bennett .................. 725/73 |
| 5,077,607 A | 12/1991 | Johnson et al. |
| 5,090,708 A | 2/1992 | Gerlitz et al. |
| 5,093,718 A | 3/1992 | Hoarty et al. |
| 5,109,414 A | 4/1992 | Harvey et al. |
| 5,109,482 A | 4/1992 | Bohrman |
| 5,114,155 A | 5/1992 | Tillery et al. |
| 5,128,752 A | 7/1992 | Von Kohorn .................. 358/84 |
| 5,132,992 A | 7/1992 | Yurt |
| 5,133,079 A | 7/1992 | Ballantyne et al. |
| 5,140,419 A | 8/1992 | Galumbeck et al. ......... 358/142 |
| 5,157,491 A | 10/1992 | Kassatly |
| 5,174,759 A | 12/1992 | Preston et al. |
| 5,176,520 A | 1/1993 | Hamilton |
| 5,177,604 A | 1/1993 | Martinez |
| 5,181,107 A | 1/1993 | Rhoades |
| 5,182,642 A | 1/1993 | Gersdorff et al. |
| 5,189,630 A | 2/1993 | Barstow et al. ............. 709/246 |
| 5,191,410 A | 3/1993 | McCalley et al. ............. 358/86 |
| 5,208,659 A | 5/1993 | Rhodes |
| 5,210,611 A | 5/1993 | Yee et al. |
| 5,220,420 A | 6/1993 | Hoarty et al. |
| 5,227,874 A | 7/1993 | Von Kohorn |
| 5,231,494 A | 7/1993 | Wachob .................. 348/385.1 |
| RE34,340 E | 8/1993 | Freeman |
| 5,236,199 A | 8/1993 | Thompson, Jr. |
| 5,239,463 A | 8/1993 | Blair et al. |
| 5,239,617 A | 8/1993 | Gardner et al. |
| 5,243,528 A | 9/1993 | Lefebvre |
| 5,247,347 A | 9/1993 | Litteral et al. |
| 5,261,820 A | 11/1993 | Slye et al. |
| 5,262,860 A | 11/1993 | Fitzpatrick et al. ......... 358/142 |
| 5,263,723 A | 11/1993 | Pearson et al. |
| 5,264,933 A | 11/1993 | Rosser et al. ............... 358/183 |
| 5,282,028 A | 1/1994 | Johnson et al. |
| 5,285,278 A | 2/1994 | Holman .................. 358/142 |
| 5,291,486 A | 3/1994 | Koyanagi |
| 5,318,450 A | 6/1994 | Carver |
| 5,340,317 A | 8/1994 | Freeman |
| 5,353,283 A | 10/1994 | Tsuchiya .................. 370/60 |
| 5,357,276 A | 10/1994 | Banker et al. |
| 5,359,510 A | 10/1994 | Sabaliauskas |
| 5,365,346 A | 11/1994 | Abumi |
| 5,388,197 A | 2/1995 | Rayner |
| 5,404,393 A | 4/1995 | Remillard |
| 5,405,152 A | 4/1995 | Katanics et al. |
| 5,412,416 A | 5/1995 | Nemirofsky |
| 5,412,720 A | 5/1995 | Hoarty et al. |
| 5,438,355 A | 8/1995 | Palmer .................. 348/1 |
| 5,442,389 A | 8/1995 | Blahut et al. |
| 5,444,499 A | 8/1995 | Saitoh |
| 5,453,794 A | 9/1995 | Ezaki |
| 5,454,722 A | 10/1995 | Holland et al. |
| 5,455,910 A | 10/1995 | Johnson et al. |
| 5,462,275 A | 10/1995 | Lowe et al. |
| 5,467,288 A | 11/1995 | Fasciano et al. |
| 5,479,268 A | 12/1995 | Young et al. .............. 358/335 |
| 5,481,542 A | 1/1996 | Logston et al. ............ 370/94.2 |
| 5,488,411 A | 1/1996 | Lewis et al. |
| 5,498,000 A | 3/1996 | Cuneo .................. 273/354 |
| 5,502,497 A | 3/1996 | Yamaashi et al. |
| 5,526,035 A | 6/1996 | Lappington et al. .......... 348/13 |
| 5,526,478 A | 6/1996 | Russell, Jr. et al. |
| 5,532,748 A | 7/1996 | Nainpally |
| 5,534,913 A | 7/1996 | Majeti et al. .................. 348/7 |
| 5,534,944 A | 7/1996 | Egawa et al. ................ 348/584 |
| 5,537,141 A | 7/1996 | Harper et al. |
| 5,539,471 A | 7/1996 | Myhrgold et al. ........... 348/473 |
| 5,541,662 A | 7/1996 | Adams et al. |
| 5,543,849 A | 8/1996 | Long .................. 348/460 |
| 5,553,221 A | 9/1996 | Reimer et al. ................ 395/154 |
| 5,557,316 A | 9/1996 | Hoarty et al. |
| 5,557,724 A | 9/1996 | Sampat et al. |
| 5,564,073 A | 10/1996 | Takahisa .................. 455/66 |
| 5,570,295 A | 10/1996 | Isenberg et al. ......... 364/514 R |
| 5,572,442 A | 11/1996 | Schulhof et al. ......... 364/514 C |
| 5,579,055 A | 11/1996 | Hamilton et al. |
| 5,585,858 A * | 12/1996 | Harper et al. .................. 725/32 |
| 5,586,257 A | 12/1996 | Perlman |
| 5,586,937 A | 12/1996 | Menashe |
| 5,589,892 A | 12/1996 | Knee et al. .................. 348/731 |
| 5,593,349 A | 1/1997 | Miguel et al. |
| 5,594,492 A | 1/1997 | O'Callaghan et al. ....... 725/151 |
| 5,594,935 A | 1/1997 | Reber et al. |
| 5,600,364 A | 2/1997 | Hendricks et al. .............. 348/1 |
| 5,600,366 A | 2/1997 | Schulman .................. 348/9 |
| 5,600,368 A | 2/1997 | Matthews, III .............. 348/143 |
| 5,600,573 A | 2/1997 | Hendricks et al. ........ 364/514 R |
| 5,603,078 A | 2/1997 | Henderson et al. |
| 5,604,542 A | 2/1997 | Dedrick .................. 348/552 |
| 5,610,653 A | 3/1997 | Abecassis |
| 5,610,661 A | 3/1997 | Bhatt .................. 348/446 |
| 5,612,730 A | 3/1997 | Lewis .................. 348/8 |
| 5,612,900 A | 3/1997 | Azadegan et al. |
| 5,613,909 A | 3/1997 | Stelovsky |
| RE35,498 E | 4/1997 | Barnard |
| 5,627,978 A | 5/1997 | Altom et al. |
| 5,633,810 A | 5/1997 | Mandal et al. |
| 5,633,918 A | 5/1997 | Mankovitz .................. 379/97 |
| 5,637,844 A | 6/1997 | Eiba |
| 5,640,193 A | 6/1997 | Wellner |
| 5,643,088 A | 7/1997 | Vaughn et al. |
| 5,649,284 A | 7/1997 | Yoshinobu .................. 455/5.1 |
| 5,652,615 A | 7/1997 | Bryant et al. |
| 5,659,366 A | 8/1997 | Kerman .................. 348/460 |
| 5,666,293 A | 9/1997 | Metz et al. |
| 5,667,708 A | 9/1997 | Glass et al. |
| 5,668,592 A | 9/1997 | Spaulding, II .............. 348/13 |
| 5,677,708 A | 10/1997 | Matthews, III et al. ...... 345/115 |
| 5,679,075 A | 10/1997 | Forrest et al. |
| 5,682,597 A | 10/1997 | Ganek et al. |
| 5,686,954 A | 11/1997 | Yoshinobu et al. ............ 348/13 |
| 5,691,986 A | 11/1997 | Pearlstein |
| 5,692,214 A | 11/1997 | Levine |
| 5,694,163 A | 12/1997 | Harrison .................. 348/13 |
| 5,695,400 A | 12/1997 | Fennell, Jr. et al. |
| 5,696,905 A | 12/1997 | Reimer et al. ................ 395/227 |
| 5,697,844 A | 12/1997 | Von Kohorn |
| 5,710,884 A | 1/1998 | Dedrick |
| 5,721,827 A | 2/1998 | Logan et al. |
| 5,724,091 A | 3/1998 | Freeman et al. |
| 5,724,103 A | 3/1998 | Batchelor .................. 348/553 |
| 5,724,521 A | 3/1998 | Dedrick |
| 5,724,567 A | 3/1998 | Rose et al. |
| 5,729,252 A | 3/1998 | Fraser .................. 345/302 |
| 5,729,471 A | 3/1998 | Jain et al. |
| 5,730,654 A | 3/1998 | Brown |
| 5,734,413 A | 3/1998 | Lappington et al. |
| 5,734,437 A | 3/1998 | Back .................. 348/563 |
| 5,734,589 A | 3/1998 | Kostreski et al. |
| 5,745,126 A | 4/1998 | Jain et al. |
| 5,745,481 A | 4/1998 | Phillips et al. |
| 5,748,186 A | 5/1998 | Raman |
| 5,748,731 A | 5/1998 | Shephard |
| 5,757,916 A | 5/1998 | MacDoran et al. |
| 5,758,079 A | 5/1998 | Ludwig et al. |

| | | | | | | |
|---|---|---|---|---|---|---|
| 5,758,257 A | 5/1998 | Herz et al. | | 5,983,069 A | 11/1999 | Cho et al. |
| 5,759,101 A | 6/1998 | Von Kohorn | | 5,987,454 A | 11/1999 | Hobbs |
| 5,761,602 A | 6/1998 | Wagner et al. ............... 455/3.1 | | 5,987,523 A | 11/1999 | Hind et al. |
| 5,761,606 A * | 6/1998 | Wolzien ..................... 725/110 | | 5,999,664 A | 12/1999 | Mahoney et al. |
| 5,771,307 A | 6/1998 | Lu et al. | | 5,999,929 A | 12/1999 | Goodman |
| 5,771,381 A | 6/1998 | Jones et al. | | 6,002,393 A | 12/1999 | Hite et al. |
| 5,774,664 A | 6/1998 | Hidary et al. .......... 395/200.48 | | 6,005,561 A | 12/1999 | Hawkins et al. |
| 5,778,181 A | 7/1998 | Hidary et al. .......... 395/200.48 | | 6,006,252 A | 12/1999 | Wolfe |
| 5,778,182 A | 7/1998 | Cathey et al. | | 6,006,256 A | 12/1999 | Zdepski et al. |
| 5,779,549 A | 7/1998 | Walker et al. | | 6,008,802 A | 12/1999 | Iki et al. |
| 5,781,227 A * | 7/1998 | Goode et al. .................. 725/32 | | 6,009,458 A | 12/1999 | Hawkins et al. |
| 5,782,692 A | 7/1998 | Stelovsky | | 6,012,083 A | 1/2000 | Savitzky et al. |
| 5,784,055 A | 7/1998 | Ngai | | 6,016,158 A | 1/2000 | Mackinnon |
| 5,786,869 A | 7/1998 | Back et al. .................. 348/565 | | 6,018,764 A | 1/2000 | Field et al. |
| 5,790,176 A | 8/1998 | Craig | | 6,018,768 A | 1/2000 | Ullmann et al. ............. 709/218 |
| 5,793,365 A | 8/1998 | Tang et al. .................. 345/329 | | 6,023,729 A | 2/2000 | Samuel et al. |
| 5,796,393 A | 8/1998 | MacNaughton et al. | | 6,026,375 A | 2/2000 | Hall et al. |
| 5,796,952 A | 8/1998 | Davis et al. | | 6,026,376 A | 2/2000 | Kenney |
| 5,801,750 A | 9/1998 | Kurihara | | 6,029,045 A | 2/2000 | Picco et al. |
| 5,813,006 A | 9/1998 | Polnerow et al. | | 6,029,172 A | 2/2000 | Jorna et al. |
| 5,818,441 A | 10/1998 | Throckmorton ............ 345/328 | | 6,029,195 A | 2/2000 | Herz |
| 5,819,261 A | 10/1998 | Takahashi et al. | | 6,038,000 A * | 3/2000 | Hurst, Jr. .................... 348/705 |
| 5,823,879 A | 10/1998 | Goldberg et al. | | 6,044,403 A | 3/2000 | Gerszberg et al. |
| 5,825,829 A | 10/1998 | Boraziani et al. | | 6,047,235 A | 4/2000 | Hiyokawa et al. |
| 5,828,421 A | 10/1998 | Boyce et al. | | 6,049,821 A | 4/2000 | Theriault et al. |
| 5,832,496 A | 11/1998 | Anand et al. | | 6,055,569 A | 4/2000 | O'Brien et al. |
| 5,846,132 A | 12/1998 | Junkin | | 6,057,856 A | 5/2000 | Miyashita et al. |
| 5,848,373 A | 12/1998 | DeLorme et al. | | 6,058,430 A | 5/2000 | Kaplan |
| 5,848,396 A | 12/1998 | Gerace | | 6,061,738 A | 5/2000 | Osaku et al. |
| 5,848,397 A | 12/1998 | Marsh et al. | | 6,064,438 A | 5/2000 | Miller |
| 5,855,516 A | 1/1999 | Eiba | | 6,064,973 A | 5/2000 | Smith et al. |
| 5,861,881 A | 1/1999 | Freeman et al. | | 6,065,050 A * | 5/2000 | DeMoney .................... 725/91 |
| 5,864,823 A | 1/1999 | Levitan | | 6,065,059 A | 5/2000 | Shieh et al. |
| 5,867,208 A | 2/1999 | McLaren | | 6,070,149 A | 5/2000 | Tavor et al. |
| 5,870,558 A | 2/1999 | Branton, Jr. et al. | | 6,072,521 A | 6/2000 | Harrison et al. ............... 725/81 |
| 5,878,222 A | 3/1999 | Harrison | | 6,075,527 A | 6/2000 | Ichihashi et al. |
| 5,878,223 A | 3/1999 | Becker et al. | | 6,075,971 A | 6/2000 | Williams et al. |
| 5,880,720 A | 3/1999 | Iwafune et al. | | 6,080,063 A | 6/2000 | Khosla |
| 5,889,950 A | 3/1999 | Kuzma | | 6,081,780 A | 6/2000 | Lumelsky |
| 5,889,951 A | 3/1999 | Lombardi | | 6,081,830 A | 6/2000 | Schindler |
| 5,890,906 A | 4/1999 | Macri et al. | | 6,082,887 A | 7/2000 | Feuer et al. |
| 5,890,963 A | 4/1999 | Yen | | 6,094,677 A | 7/2000 | Capek et al. |
| 5,892,909 A | 4/1999 | Grasso et al. .......... 395/200.31 | | 6,098,085 A | 8/2000 | Blonder et al. |
| 5,894,556 A | 4/1999 | Grimm et al. | | 6,101,180 A | 8/2000 | Donahue et al. |
| 5,905,865 A | 5/1999 | Palmer et al. | | 6,101,486 A | 8/2000 | Roberts et al. |
| 5,907,322 A | 5/1999 | Kelly et al. | | 6,102,797 A | 8/2000 | Kail |
| 5,907,680 A | 5/1999 | Nielsen | | 6,102,969 A | 8/2000 | Christianson et al. |
| 5,912,700 A | 6/1999 | Honey et al. ................ 348/157 | | 6,104,443 A | 8/2000 | Adcock et al. |
| 5,913,040 A | 6/1999 | Rakavy et al. | | 6,108,703 A | 8/2000 | Leighton et al. |
| 5,917,725 A | 6/1999 | Thacher et al. | | 6,112,181 A | 8/2000 | Shear et al. |
| 5,917,830 A | 6/1999 | Chen et al. | | 6,112,212 A | 8/2000 | Heitler |
| 5,918,009 A | 6/1999 | Gehani et al. | | 6,119,165 A | 9/2000 | Li et al. |
| 5,918,014 A | 6/1999 | Robinson | | 6,122,647 A | 9/2000 | Horowitz et al. |
| 5,926,179 A | 7/1999 | Matsuda et al. | | 6,122,658 A | 9/2000 | Chaddha ..................... 709/203 |
| 5,929,849 A | 7/1999 | Kikinis | | 6,126,547 A | 10/2000 | Ishimoto et al. |
| 5,929,850 A | 7/1999 | Broadwin et al. | | 6,128,482 A | 10/2000 | Nixon et al. |
| 5,930,493 A | 7/1999 | Ottesen et al. | | 6,131,120 A | 10/2000 | Reid |
| 5,933,822 A | 8/1999 | Branden-Harder et al. | | 6,134,584 A | 10/2000 | Chang et al. |
| 5,937,329 A | 8/1999 | Helmy et al. | | 6,138,144 A | 10/2000 | DeSimone et al. |
| 5,937,331 A | 8/1999 | Kalluri et al. | | 6,141,010 A | 10/2000 | Hoyle |
| 5,940,082 A | 8/1999 | Brinegar et al. ............. 345/442 | | 6,144,848 A | 11/2000 | Walsh et al. |
| 5,940,595 A | 8/1999 | Reber et al. | | 6,144,991 A | 11/2000 | England |
| 5,941,774 A | 8/1999 | Takemoto et al. | | 6,151,626 A | 11/2000 | Tims et al. |
| 5,947,747 A | 9/1999 | Walker et al. | | 6,157,953 A | 12/2000 | Chang et al. |
| 5,948,040 A | 9/1999 | DeLorme et al. | | 6,163,803 A | 12/2000 | Watanabe |
| 5,951,636 A | 9/1999 | Zerber | | 6,173,317 B1 | 1/2001 | Chaddha et al. |
| 5,954,798 A | 9/1999 | Shelton et al. | | 6,177,931 B1 | 1/2001 | Alexander et al. |
| 5,956,038 A | 9/1999 | Rekimoto | | 6,181,334 B1 | 1/2001 | Freeman et al. |
| 5,956,716 A | 9/1999 | Kenner et al. | | 6,181,711 B1 | 1/2001 | Zhang et al. |
| 5,961,603 A | 10/1999 | Kunkel et al. | | 6,182,072 B1 | 1/2001 | Leak et al. |
| 5,973,685 A | 10/1999 | Schaffa et al. | | 6,182,116 B1 | 1/2001 | Namma et al. |
| 5,978,833 A | 11/1999 | Pashley et al. | | 6,192,340 B1 | 2/2001 | Abecassis |
| 5,982,436 A | 11/1999 | Balakrishnan et al. | | 6,192,394 B1 | 2/2001 | Gutfreund et al. |

| | | | |
|---|---|---|---|
| 6,193,610 B1 | 2/2001 | Junkin |
| 6,195,680 B1 | 2/2001 | Goldszmidt et al. |
| 6,199,014 B1 | 3/2001 | Walker et al. |
| 6,199,045 B1 | 3/2001 | Giniger et al. |
| 6,204,842 B1 | 3/2001 | Fujii |
| 6,205,582 B1 | 3/2001 | Hoarty |
| 6,233,736 B1 | 5/2001 | Wolzien |
| 6,239,797 B1 | 5/2001 | Hills et al. |
| 6,240,183 B1 | 5/2001 | Marchant |
| 6,240,555 B1 | 5/2001 | Shoff et al. |
| 6,253,228 B1 | 6/2001 | Ferris et al. |
| 6,256,785 B1 | 7/2001 | Klappert et al. |
| 6,260,192 B1 | 7/2001 | Rosin et al. |
| 6,266,649 B1 | 7/2001 | Linden et al. |
| 6,275,705 B1 | 8/2001 | Drane et al. |
| 6,278,942 B1 | 8/2001 | McDonough |
| 6,279,007 B1 | 8/2001 | Uppala |
| 6,285,407 B1 | 9/2001 | Yasuki et al. |
| 6,286,140 B1 | 9/2001 | Inanyi |
| 6,288,753 B1 | 9/2001 | DeNicola et al. |
| 6,289,362 B1 | 9/2001 | Van Der Meer |
| 6,292,780 B1 | 9/2001 | Doederlein et al. |
| 6,297,748 B1 | 10/2001 | Lappenbusch et al. |
| 6,298,330 B1 | 10/2001 | Gardenswartz et al. |
| 6,317,722 B1 | 11/2001 | Jacobi et al. |
| 6,317,780 B1 | 11/2001 | Cohn et al. |
| 6,317,791 B1 | 11/2001 | Cohn et al. |
| 6,326,982 B1 | 12/2001 | Wu et al. |
| 6,327,574 B1 | 12/2001 | Kramer et al. |
| 6,330,592 B1 | 12/2001 | Makuch et al. |
| 6,345,122 B1 | 2/2002 | Yamato et al. |
| 6,353,933 B1 | 3/2002 | Love |
| 6,366,914 B1 | 4/2002 | Stern |
| 6,373,904 B1 | 4/2002 | Sakamoto |
| 6,389,458 B2 | 5/2002 | Shuster |
| 6,397,220 B1 | 5/2002 | Deisinger et al. |
| 6,401,085 B1 | 6/2002 | Gershman et al. |
| 6,412,011 B1 | 6/2002 | Agraharam et al. |
| 6,418,169 B1 | 7/2002 | Datari |
| 6,424,979 B1 | 7/2002 | Livingston et al. |
| 6,425,012 B1 | 7/2002 | Trovato et al. |
| 6,434,621 B1 | 8/2002 | Pezzillo et al. |
| 6,434,747 B1 | 8/2002 | Khoo et al. |
| 6,442,590 B1 | 8/2002 | Inala et al. |
| 6,442,598 B1 | 8/2002 | Wright et al. |
| 6,442,687 B1 | 8/2002 | Savage |
| 6,457,010 B1 | 9/2002 | Eldering et al. |
| 6,460,180 B1 | 10/2002 | Park et al. |
| 6,463,585 B1 | 10/2002 | Hendricks et al. |
| 6,466,929 B1 | 10/2002 | Brown et al. |
| 6,466,969 B1 | 10/2002 | Bunney et al. |
| 6,473,903 B2 | 10/2002 | Balakrishnan et al. |
| 6,480,885 B1 | 11/2002 | Olivier |
| 6,486,892 B1 | 11/2002 | Stern |
| 6,487,721 B1 | 11/2002 | Sadafi |
| 6,496,980 B1 | 12/2002 | Tillman et al. |
| RE37,957 E | 1/2003 | Garfield |
| 6,509,908 B1 | 1/2003 | Croy et al. |
| 6,513,069 B1 | 1/2003 | Abato et al. |
| 6,526,041 B1 | 2/2003 | Shaffer et al. |
| 6,526,335 B1 | 2/2003 | Treyz et al. |
| 6,549,241 B2 | 4/2003 | Hiroi |
| 6,571,234 B1 | 5/2003 | Knight et al. |
| 6,577,716 B1 | 6/2003 | Minter et al. |
| 6,578,025 B1 | 6/2003 | Pollack et al. |
| 6,580,462 B2 | 6/2003 | Inoue et al. |
| 6,591,247 B2 | 7/2003 | Stern |
| 6,597,374 B1 | 7/2003 | Baker et al. |
| 6,597,405 B1 | 7/2003 | Iggulden |
| 6,606,657 B1 | 8/2003 | Zilberstein et al. |
| 6,611,872 B1 | 8/2003 | McCanne |
| 6,615,408 B1 | 9/2003 | Kaiser et al. |
| 6,625,624 B1 | 9/2003 | Chen et al. |
| 6,625,647 B1 | 9/2003 | Barrick et al. |
| 6,643,691 B2 | 11/2003 | Austin |
| 6,661,372 B1 | 12/2003 | Girerd et al. |
| 6,698,020 B1 | 2/2004 | Zigmond et al. |
| 6,725,159 B2 | 4/2004 | Krasner |
| 6,732,158 B1 | 5/2004 | Hesselink et al. |
| 6,760,749 B1 | 7/2004 | Dunlap et al. |
| 6,760,916 B2 | 7/2004 | Holtz et al. |
| 6,769,130 B1 | 7/2004 | Getsin et al. |
| 6,792,615 B1 | 9/2004 | Rowe et al. |
| 7,079,176 B1 | 7/2006 | Freeman et al. |
| 2001/0000537 A1 | 4/2001 | Inala et al. |
| 2001/0003823 A1 | 6/2001 | Mighdoll et al. |
| 2001/0013123 A1 | 8/2001 | Freeman et al. |
| 2002/0032905 A1 | 3/2002 | Sherr et al. |
| 2002/0053078 A1 | 5/2002 | Holtz et al. |
| 2002/0056091 A1 | 5/2002 | Bala et al. |
| 2002/0056129 A1 | 5/2002 | Blackketter et al. |
| 2002/0112002 A1 | 8/2002 | Abato |
| 2002/0156909 A1 | 10/2002 | Harrington |
| 2002/0188943 A1 | 12/2002 | Freeman et al. |
| 2002/0194589 A1 | 12/2002 | Cristofalo et al. |
| 2004/0261127 A1 | 12/2004 | Freeman et al. |

FOREIGN PATENT DOCUMENTS

| | | |
|---|---|---|
| AU | 717399 | 7/2000 |
| CA | 246437 | 1/1925 |
| CA | 2345161 | 6/1994 |
| CA | 2245841 | 8/1994 |
| CA | 2186027 | 9/1995 |
| CA | 2220483 | 11/1996 |
| DE | 994233 | 6/1965 |
| DE | 44 27 046 A1 | 2/1996 |
| DE | 44 31 438 A1 | 3/1996 |
| EP | 16314 | 10/1980 |
| EP | 128481 | 12/1984 |
| EP | 0 163 577 | 12/1985 |
| EP | 0 163 577 A2 | 12/1985 |
| EP | 0 314 572 A2 | 5/1989 |
| EP | 314572 | 5/1989 |
| EP | 0424648 A2 | 5/1991 |
| EP | 0489387 | 12/1991 |
| EP | 0 562 221 A1 | 9/1993 |
| EP | 0 632 659 A | 1/1995 |
| EP | 0 673 164 | 3/1995 |
| EP | 0 673 164 A1 | 3/1995 |
| EP | 0707426 A | 4/1996 |
| EP | 0757485 | 2/1997 |
| EP | 0 805 598 | 11/1997 |
| EP | 0 805 598 A1 | 11/1997 |
| EP | 0 837 609 | 4/1998 |
| EP | 0 837 609 A2 | 4/1998 |
| EP | 0 847 200 | 6/1998 |
| EP | 0 847 200 A1 | 6/1998 |
| EP | 0852443 A2 | 7/1998 |
| EP | 0 871 337 | 10/1998 |
| EP | 0 871 337 A2 | 10/1998 |
| EP | 0 879 536 B1 | 11/1998 |
| EP | 0 879 536 B1 | 11/1998 |
| EP | 0879 536 B1 | 11/1998 |
| EP | 0901284 A2 | 3/1999 |
| EP | 0 952 539 | 10/1999 |
| EP | 0 952 539 A2 | 10/1999 |
| EP | 0982943 | 5/2000 |
| EP | 1 021 037 A2 | 7/2000 |
| EP | 1 021 037 A2 | 7/2000 |
| EP | 1021 037 A2 | 7/2000 |
| EP | 1 021 037 A3 | 8/2000 |
| EP | 1 061 739 A2 | 12/2000 |
| EP | 1 089 201 | 4/2001 |
| EP | 1 089 201 A1 | 4/2001 |

| | | |
|---|---|---|
| EP | 1111914 A1 | 6/2001 |
| GB | 2 132 856 | 7/1984 |
| GB | 2 132 856 A | 7/1984 |
| GB | 2 325 537 | 11/1998 |
| GB | 2 325 537 A | 11/1998 |
| GB | 2 327 837 | 2/1999 |
| GB | 2 327 837 A | 2/1999 |
| GB | 2290431 | 12/1999 |
| GB | 2 347 055 | 8/2000 |
| GB | 2 347 055 A | 8/2000 |
| GB | 2 350 213 | 11/2000 |
| GB | 2 350 213 A | 11/2000 |
| GB | 2 353 430 A | 2/2001 |
| GB | 2353430 | 2/2001 |
| GB | 2356319 A | 5/2001 |
| GB | 2 359 708 | 8/2001 |
| GB | 2 359 708 A | 8/2001 |
| GB | 2 359 958 | 9/2001 |
| GB | 2 359 958 A | 9/2001 |
| JP | 4-127688 | 4/1992 |
| JP | 5-64167 | 3/1993 |
| JP | 5176306 | 7/1993 |
| JP | 060303543 | 10/1994 |
| JP | 7-288606 | 10/1995 |
| JP | 7-307813 | 11/1995 |
| JP | 8-8860 | 1/1996 |
| JP | 10-222541 | 8/1998 |
| KR | 1997-0009356 | 2/1997 |
| WO | 8102961 | 10/1981 |
| WO | WO-90-00847 A1 | 1/1990 |
| WO | WO 93/06675 | 4/1993 |
| WO | WO 93/06675 A1 | 4/1993 |
| WO | WO 93/07713 | 4/1993 |
| WO | WO 93/07713 A1 | 4/1993 |
| WO | WO 93/11617 | 6/1993 |
| WO | WO 9311617 | 6/1993 |
| WO | WO 93/22877 | 11/1993 |
| WO | WO 9322877 | 11/1993 |
| WO | 9403851 | 2/1994 |
| WO | WO 9413107 | 6/1994 |
| WO | WO 9605699 | 2/1996 |
| WO | WO 96/08923 | 3/1996 |
| WO | WO 96/08923 A1 | 3/1996 |
| WO | WO 9607270 | 3/1996 |
| WO | WO 9613124 | 5/1996 |
| WO | WO 96/17492 | 6/1996 |
| WO | WO 96/17492 A2 | 6/1996 |
| WO | WO 9637075 | 11/1996 |
| WO | WO 97/02689 | 1/1997 |
| WO | WO 97/02689 A1 | 1/1997 |
| WO | WO 9702699 | 1/1997 |
| WO | WO 97/22207 | 6/1997 |
| WO | WO 97/22207 A1 | 6/1997 |
| WO | WO 9727546 | 7/1997 |
| WO | WO 97/29591 | 8/1997 |
| WO | WO 97/29591 A1 | 8/1997 |
| WO | WO 9729458 | 8/1997 |
| WO | WO 97/33434 | 9/1997 |
| WO | WO 97/33434 A1 | 9/1997 |
| WO | WO 97/45965 | 12/1997 |
| WO | WO 97/45965 A1 | 12/1997 |
| WO | WO 98/08340 | 2/1998 |
| WO | WO 98/08340 A1 | 2/1998 |
| WO | WO 9808340 A1 | 2/1998 |
| WO | WO 98/23080 | 5/1998 |
| WO | WO 98/23080 A2 | 5/1998 |
| WO | WO 98/29956 | 7/1998 |
| WO | WO 98/29956 A2 | 7/1998 |
| WO | WO 98/32281 | 7/1998 |
| WO | WO 98/32281 A1 | 7/1998 |
| WO | WO 98/32284 | 7/1998 |
| WO | WO 98/32284 A1 | 7/1998 |
| WO | WO 98/44737 | 10/1998 |
| WO | WO 98/44737 A1 | 10/1998 |
| WO | WO-98-45902 A1 | 10/1998 |
| WO | WO-98-48566 A2 | 10/1998 |
| WO | WO 98/54902 | 12/1998 |
| WO | WO 98/54902 A1 | 12/1998 |
| WO | WO 99/09741 | 2/1999 |
| WO | WO 99/09741 A1 | 2/1999 |
| WO | WO 99/26415 | 5/1999 |
| WO | WO 99/26415 A1 | 5/1999 |
| WO | WO 99/27713 | 6/1999 |
| WO | WO 99/27713 A2 | 6/1999 |
| WO | WO 9939506 | 8/1999 |
| WO | WO 99/44159 | 9/1999 |
| WO | WO 99/44159 A1 | 9/1999 |
| WO | WO 99/45726 | 9/1999 |
| WO | WO 99/45726 A1 | 9/1999 |
| WO | WO 99/50778 | 10/1999 |
| WO | WO 99/50778 A1 | 10/1999 |
| WO | WO-99-55066 A1 | 10/1999 |
| WO | WO 00/14987 | 3/2000 |
| WO | WO 00/14987 A1 | 3/2000 |
| WO | WO 00 16544 A | 3/2000 |
| WO | WO-0016544 A3 | 3/2000 |
| WO | WO 00/36836 | 6/2000 |
| WO | WO 00/36836 A1 | 6/2000 |
| WO | WO 00/36886 | 6/2000 |
| WO | WO 00/36886 A1 | 6/2000 |
| WO | WO 00/43853 | 7/2000 |
| WO | WO 00/43853 A2 | 7/2000 |
| WO | WO 00/43892 | 7/2000 |
| WO | WO 00/43892 A1 | 7/2000 |
| WO | WO 00/43899 | 7/2000 |
| WO | WO 00/43899 A1 | 7/2000 |
| WO | WO-00-45599 A2 | 8/2000 |
| WO | WO 00/51310 | 8/2000 |
| WO | WO 00/51310 A1 | 8/2000 |
| WO | WO-0045599 A2 | 8/2000 |
| WO | WO 00/77664 | 12/2000 |
| WO | WO 00/77664 A2 | 12/2000 |
| WO | WO-01-15357 A1 | 3/2001 |
| WO | WO 01/24027 | 4/2001 |
| WO | WO 01/24027 A1 | 4/2001 |
| WO | WO-01-58132 A2 | 8/2001 |
| WO | WO 02/31627 | 4/2002 |
| WO | WO 02/31627 A2 | 4/2002 |
| WO | WO 02/065252 | 8/2002 |
| WO | WO 02/065252 A2 | 8/2002 |
| WO | WO 02/065318 | 8/2002 |
| WO | WO 02/065318 A2 | 8/2002 |

OTHER PUBLICATIONS

EarthWeb and ACTV Unveil HyperTV, http://www.3dsite.com/3dsite/cgi/publications/daily-spectrum/issue206.html; date unknown.

Willebeek-Lemair, et al., On Multi-point Control Units for Videoconferencing,1994, pp. 356-364, IBM T. J. Watson Research Center.

Canadian Intellectual Property Office Communication, Jul. 21, 2003, pp. 1-5.

European Patent Office Communication pursuant to Article 96(2) EPC, Jul. 3, 2003, pp. 1-4.

Wittig et al. "Intelligent Media Agents in Interactive Television Systems," IEEE, 1995.

Yu et al. Design and Analysis of a Look-Ahead Scheduling Scheme to Support Pause-Resume for Video-on-Demand Applications, 1995.

European Search Report Dated Oct. 8, 2003.

"Different takes on Wedding TV to Web," Newsbytes, 'Online! Mar. 1, 1999, XP002257234 Retrieved from the Internet: <URL:www.exn.ca/Stories/1999/03/01/04.asp> retrieved on Oct. 9, 2003! * p. 1, last paragraph*.

Kieron Murphy: "HyperTV fuses Java with television" Javaworld, 'Online! May 1996, XP00257236 Retrieved from the Internet:

<URL:www.javaworld.com/javaworld/jw-05-1996/jw-05-hypertv.html> 'retrieved on Oct. 9, 2003!.

Korean Office Action mailed May 1, 2004 issued in counterpart application with English translation of Examiner's Grounds for Rejection.

Susie J.Wee et al., "Slicing MPEG Video Streams in the Compressed Domain", IEEE, 1997, pp. 225-230.

Norm Hurst et al., "MPEG Splicing: A New Standard for Television—SMPTE 312M," Nov. 1998, pp. 978-988.

"Joining Television and the Internet Using Java", Internet Week, pp. 1-2, Apr. 1, 1996.

Dybvik et al., "Combining WWW/Mosaic with Realtime Multimedial Conferencing in Distance Education," The Second International WWW Conference '94, Mosaic and the Web, Advance Proceedings, vol. 1, Oct. 17-20, 1994 at 423.

Tak K. Woo et al., "A Synchronous Collaboration Tool for the World-Wide Web," Second International WWW Conference '94, Mosaic and the Web, Advance Proceedings, vol. 1, Oct. 17-20, 1994, at 315.

Intercast Industry Group, Press Release, "Leaders in PC, Broadcast and Cable Industries Announce Formation of Industry Group to Promote New Digital Medium for the Home PC," Business Wire, Oct. 23, 1995.

"Frequently Asked Questions," The Intercast Industry Group, Fall 1996, pp. 1-7.

Vinay Kumar et al., "A Shared Web to Support Design Teams," Third Workshop on Enabling Technologies: Infrastructure for Collaborative Enterprises, Morgantown, West Virginia, Apr. 17-19, 1994 at 178.

Nikkei Bp Corp., "Intercast Using Gap Television Signal," Nikkei Electronics, Japan, Dec. 18, 1995, No. 651, p. 106.

Television Society, "Interactive Television Broadcast Using Character Broadcast Systems, Video Information and Broadcast Technology," Nov. 20, 1995, vol. 11, p. 1482-1487.

Cline et al., "DirectShow RTP Support for Adaptivity in Networked Multimedia Applications", Multimedia Computing and Systems, 1998, Proceedings, IEEE International Conference Jun. 28-Jul. 1, 1998, pp. 13-22.

Mannos, T.J., "Re: Web page prefetching?" located at <URL:http://dejanews.com> retrieved on Oct. 4, 2002, DEJA News (Online), Dec. 1, 1997.

Philippe Le Hegaret, "Document Object Module (DOM)," Architecture Domain retrieved from www.w3.org/DOM/ on Jun. 22, 2001, 2 pages.

S. Gillich et al., "ATVEF Integration with DVB Using IP/MPE," Dec. 20, 1999, retrieved from www.atvef.com/library/atvef-dub-bindingR8.html retrieved on Jun. 8, 2001, 5 pages.

J. Steinhorn et al., "Embedded Systems Programming-Enhancing TV with ATVEF," retrieved from www.embedded.com/1999/9910/9910ial.htm on Mar. 28, 2000, 10 pages.

"Enhanced Content Specification," ATVEF, 1998, retrieved from www.atvef.com/library/spec1-la.html on Mar. 28, 2000, 38 pages.

"Advanced Television Enhancement Forum Specification (ATVEF)," Comment Draft Version 1.0rl, Feb. 25, 1999, XP002142688.

Advanced Television Systems Committee, "ATSC Digital Television Standard Revision A," Apr. 6, 2001, pp. 1-65.

Advanced Television Systems Committee, "ATSC, Summary of Standards and Activities," Nov. 21, 2000, pp. 1-3.

Advanced Television Systems Committee, "ATSC Data Broadcast Standard," Jul. 26, 2000, pp. 1-88.

Eitz, "Combiners for Videotext Signals," Broadcast Technology Reports, translation of vol. 28, No. 6, Nov. 1984, pp. 273-289, XP002182048, Norderstedt, Germany.

"Overview," located at www.claria.com/companyinfo/ visited on Mar. 1, 2005.

"Real System G2 Production Guide," 1998-2000; pp. 75-79.

Almerot Quinn "IP Multicast Applications: Challenges and Solutions," IETF Draft retrieved from the Internet: URL:http://www.cs.ucsb.edu/~almeroth/classes/S00.276/papers/McastApps.txt retrieved on Mar. 3, 2005; pp. 1-27.

Zabele Braudes "Requirements for Multicast Protocols," IETF RFC, retrieved from the Internet:URL:www.ietf.org/rfc/rfc1458,txt, May 1993, pp. 1-19.

Atnewyorkstaff: "ACTV Reinvents Internet Television Service," retrieved from the Internet: URL:http://www.atnewyork.com/news/article.php/249871 retrieved on Oct. 17, 2003, 1 page.

Kieron Murphy:"HyperTV fuses Java with television" JAVAWORLD, 'Online! May 1996, XP00257236 Retrieved from the Internet: <URL:www.javaworld.com/javaworld/jw-05-1996/jw-05-hypertv.html> 'retrieved on Oct. 9, 2003!.

Dybvik et al., "Combining WWW/Mosaic with Realtime Multimedia Conferencing in Distance Education," The Second International WWW Conference '94, Mosaic and the Web, Advance Proceedings, vol. 1, Oct. 17-20, 1994 at 423.

Intercast Industry Group, Press Release, "Leaders in PC. Broadcast and Cable Industries Anounces Formation of Industry Group to Promote New Digital Medium for the Home PC," Business Wire, Oct. 23, 1995.

Phillippe Le Hegaret, "Document Object Module (DOM)," Architecture Domain retrieved from www.w3.org/DOM/ on Jun. 22, 2001, 2 pages.

Bryan Proffit, "Intercast Brings the Web to TV," Jan. 21, 1997, PC Magazine, pp. 203-204.

Funkschau, De, Franzis-Verlag K.G. Munchen; "Verknuepfung Von TV MIT Internet" (Combining TV with the Internet), vol. 16, No. 18; Aug. 16, 1996, pp. 70-71, middle column, p. 71, paragraph 2. (English translation attached.).

Tsuruta et al., A Knowledge Based Interactive Train Scheduling System Aiming at Large Scale Complex Planning Expert Systems, International Workshop on Artifical Intelligence for Industrial Applications, 1988, pp. 490-495.

Harless et al., Interactive Video Disc Case Studies for Medical Education, 10th Annual Symposium on Computer Applications in Medical Care, Oct. 25-26, 1986, pp. 183-187.

Bock; Videodisk Standards: A Software View of the Technology, SMPTE Journal, vol. 92, No. 5, May 1983, pp. 571-576.

Campbell, Optimal Decision Making in a Business Simulation, System Sciences, 1989 Annual Hawaii International Conference, vol. III, pp. 822-831.

F. Dawson; Compression of the Fast Track, Cablevision, Apr. 22, 1991, pp. 22-30.

Y. Gault; Turning Cold Box Into Interactive TV, Crain's New York Business, Jul. 15, 1991, p. 17.

G. Gilder; Now or Never, Forbes, Oct. 14, 1991pp. 188-189.

G. Kim; First All-Digital HDTV Developed by Video Cipher, Multichannel News, Jun. 11, 1990, p. 35.

G. Kim; ATC: Technical Tidal Wave to Engulf Cable Industry, Multichannel News, Aug. 13, 1990, pp. 33-34.

G. Kim; Jerrold Offers Cable Digital Compression, Multichannel News, Mar. 11, 1991, p. 6.

G. Kim; Test Equipment for Digital Still a Puzzle, Multichannel News, May 27, 1991, p. 24.

Martial et al., An Interactive Planner for Open Systems, Proceedings of the 4th Conference on Artificial Intelligence, Mar. 1988, pp. 293-298.

R. Powell; Digitizing TV Into Obsolescence. New York Times, Oct. 20, 1991.

H.F. Waterset, et al.; Talking Back to the Tube, Newsweek, Dec. 3, 1990, pp. 56-57.

Will It Revolutionize HDTV?, Broadcasting, Jun. 4, 1990, pp. 33-34.

Video Storage In Digital Transmission, Specs Technology, Cable Television Laboratories, vol. 3, No. 7, 1991, pp. 1-6.

Yu. P.S. et al., "Design and Analysis of a Look-Ahead Scheduling Scheme to Support Pause-Resume for Video-On-Demand Applications." Multimedia Systems, vol. 3, No. 4, Jan. 1, 1995, pp. 137-149, XP000576898.

"Web TV over Digital Cable"; Dale Cripps; May 4, 1998; http://web-star.com/hdtvnews/webtvoverdigitalcable.html; pp. 1-4.

"Internet TV Advertising"; Dale Cripps; May 8, 1998; http://web-star.com/hdtvnews/internettgadvertising.html; pp. 1-3.

"Gates, TV, Interactivity"; Dale Cripps; May 5, 1998; http://web-star.com/hdtvnews/gatestvinteractivity.html. 1-4.

"ICTV" Brochure (a reproduced copy provided); copyright 1988 by ICTV; 27 pages.

"TV Navigator" brochure; copyright 1997 by Network Computer, Inc.; 6 pages.

"Worldgate" brochure; copyright 1998 by Worldgate Communications; 12 pages.

"Funkschau Fachzeitschrift-für elektronische Kommunikation", vol. 6/96 of 3-1-96., pp. 70-75. and English Translation of extract from Funkschau Fachzeitschrift füelektronische Kommunikation.

"U.S. Appl. No. 08/598,382, Notice Of Allowance mailed Jul. 16, 1998", 5 pgs.

"U.S. Appl. No. 08/598,382, Advisory Action mailed May 22, 1998", 1 pg.

"U.S. Appl. No. 08/598,382, Examiner's Interview Summary mailed May 5, 1998", 2 pgs.

"U.S. Appl. No. 08/598,382, Final Office Action mailed Jan. 12, 1998", 11 pgs.

"U.S. Appl. No. 08/598,382, Non Final Office Action mailed Apr. 17, 1997", 9 pgs.

"U.S. Appl. No. 08/598,382, Response filed Feb. 8, 1996 to Non Final Office Action mailed Oct. 17, 1997", 17 pgs.

"U.S. Appl. No. 08/598,382, Response filed May 12, 1998 to Final Office Action mailed Jan. 12, 1998", 13 pgs.

"U.S. Appl. No. 08/815,168, Advisory Action mailed May 8, 2002", 6 pgs.

"U.S. Appl. No. 08/815,168, Response filed Mar. 12, 2001 to Restriction Requirement mailed Feb. 12, 2001", 2 pgs.

"U.S. Appl. No. 08/815,168, Preliminary Amendment mailed Feb. 2, 2001", 29 pgs.

"U.S. Appl. No. 08/815,168, Preliminary Amendment mailed Jul. 2, 1999", 30 pgs.

"U.S. Appl. No. 08/815,168, Preliminary Amendment mailed Dec. 17, 1998", 8 pgs.

"U.S. Appl. No. 08/815,168, Response filed Jun. 7, 2000 Restriction Requirement mailed May 8, 2000", 2 pgs.

"U.S. Appl. No. 08/815,168, Response filed Oct. 27, 2000 to Restriction Requirement mailed Aug. 28, 2000", 2 pgs.

"U.S. Appl. No. 08/815,168, Response filed Nov. 17, 2000 to Restriction Requirement mailed Aug. 28, 2000", 2 pgs.

"U.S. Appl. No. 08/815,168, Restriction Requirement mailed May 8, 2000", 5 pgs.

"U.S. Appl. No. 08/815,168, Restriction Requirement mailed Aug. 28, 2000", 5 pgs.

"U.S. Appl No. 08/815,168, Restriction Requirement mailed Nov. 4, 1999", 5 pgs.

"U.S. Appl. No. 08/815,168, Examiner Interview Summary mailed Apr. 23, 2002", 2 pgs.

"U.S. Appl. No. 08/815,168, Final Office ACtion mailed Jul. 29, 2003", 9 pgs.

"U.S. Appl. No. 08/815,168, Final Office Action mailed Dec. 9, 2001", 11 pgs.

"U.S. Appl. No. 08/815,168, Non Final Office Action mailed May 9, 2001", 11 pgs.

"U.S. Appl. No. 08/815,168, Non Final Office Action mailed Sep. 16, 2002", 7 pgs.

"U.S. Appl. No. 08/815,168, Non-Final Office Action mailed Dec. 2, 2004", 9 pgs.

"U.S. Appl. No. 08/815,168, Response filed Jan. 22, 2003 to Non Final Office Action mailed Jan. 16, 2003", 7 pgs.

"U.S. Appl. No. 08/815,168, Response filed Mar. 11, 1997 to Final Office Action mailed Apr. 19, 2002", 11 pgs.

"U.S. Appl. No. 08/815,168, Response filed Mar. 11, 1997 to Non Final Office Action mailed Oct. 9, 2001", 15 pgs.

"U.S. Appl. No. 09/699,163, Final Office Action mailed Jul. 19, 2005", 9 pgs.

"U.S. Appl. No. 09/699,163, Non Final Office Action mailed Dec. 1, 2004", 9 pgs.

"U.S. Appl. No. 09/699,163, Notice of Allowance mailed Nov. 29, 2005", 6 pgs.

"U.S. Appl. No. 09/699,163, Response filed Oct. 27, 2000 to Non Final Office Action mailed Mar. 1, 2005", 3 pgs.

"U.S. Appl. No. 09/699,164, Non-Final Office Action mailed Dec. 2, 2004", 9 pgs.

"U.S. Appl. No. 09/699,222, Advisory Action mailed Dec. 14, 2005", 3 pgs.

"U.S. Appl. No. 09/699,222, Final Office Action mailed Sep. 22, 2005", 20 pgs.

"U.S. Appl. No. 09/699,222, Non-Final Office Action mailed Mar. 28, 2005", 14 pgs.

"U.S. Appl. No. 09/699,222, Non-Final Office Action mailed Apr. 19, 2007", 15 pgs.

"U.S. Appl. No. 09/699,222, Response filed Jun. 28, 2005 to Non-Final Office Action mailed Mar. 28, 2005", 10 pgs.

"U.S. Appl. No. 09/699,222, Response filed Nov. 22, 2005 to Final Office Action mailed Sep. 22, 2005", 12 pgs.

"U.S. Appl. No. 09/699,222, Response filed Dec. 3, 2004 to Restriction requirement mailed Nov. 3, 2004", 9 pgs.

"U.S. Appl. No. 09/699,222, Response filed Dec. 26, 2007 to Non-Final Office Action mailed Apr. 19, 2007", 14 pgs.

"U.S. Appl. No. 09/699,222, Restriction Requirement mailed Nov. 3, 2004", 5 pgs.

"U.S. Appl. No. 09/699,230, Non-Final Office Action mailed Jun. 6, 2005", 7 pgs.

"U.S. Appl. No. 09/699,230, Non-Final Office Action mailed Oct. 5, 2004", 7 pgs.

"U.S. Appl. No. 09/699,230, Response filed Feb. 7, 2005 to Non-Final Office Action mailed Oct. 5, 2004", 6 pgs.

"U.S. Appl. No. 10/765,044, Non-Final Office Action mailed Apr. 4, 2008", 27 pgs.

* cited by examiner

DIGITAL INTERACTIVE SYSTEM FOR PROVIDING FULL INTERACTIVITY WITH LIVE PROGRAMMING EVENTS

CROSS REFERENCE TO RELATED APPLICATIONS

This application is a continuation of U.S. application Ser. No.08/815,168 filed 11 Mar. 1997, which is a continuation-in-part of application Ser. No. 08/598,382 filed Feb. 8, 1996 now U.S. Pat. No. 5,861,881, which is a continuation-in-part of application Ser. No. 08/443,607 filed May 18, 1995, now U.S. Pat. No. 5,724,091, which is continuation-in-part of application Ser. No. 08/166,608 filed Dec. 13, 1993, now abandoned, which in turn is a continuation of application Ser. No. 07/797,298 filed Nov. 25, 1991, now abandoned, each of which are hereby incorporated herein by reference in their entirety.

BACKGROUND OF THE INVENTION

Interactive video and audio presentation systems are currently being introduced into the entertainment and educational industries. A prominent interactive technology that has been applied successfully in these industries is based on providing interactivity in a one-way system through the provision of multiple time-synched parallel channels of information. For example, commonly owned Freeman et al. patents, U.S. Pat. Nos. 4,264,925 and 4,264,924, which provide both audio and video interactivity, disclose interactive television systems where switching among multiple broadcast or cable channels based on viewer selections provides an interactive capability.

These systems have been enhanced to include memory functions using computer logic and memory, where selection of system responses played to the viewer are based on the processing and storage of subscriber responses, as disclosed in Freeman patent, U.S. Pat. No. 4,507,680.

The benefits of providing interactivity through the use of different audio responses is disclosed in Freeman, U.S. Pat. Nos. 4,847,698, 4,847,699 and 4,847,700. These television systems provide a common video signal accompanied by several synchronized audio channels to provide content related user selectable responses. The audio signals produce different audio responses, and in some cases, these are syllable synched to a first audio script and to the video signal (such as to a person or character on a display), providing the perception that the person's or character's mouth movements match the spoken words.

Interactivity is brought to the classroom in the Freeman U.S. Pat. No. 5,537,141. The distance learning system claimed in this application enhances the classroom educational experience through an innovative use of interactive technology over transmission independent media. When an instructor, either broadcast live on video or displayed from videotape, asks a question, each and every student responds, preferably by entering a response on a remote handset, and each student immediately receives a distinct and substantive audio response to his or her unique selection. The individualization of audio response from the interactive program is a major aspect of the invention.

Individualization of audio is brought to the home based on the technology disclosed in Freeman U.S. Pat. No. 5,585,858. This system provides a program that can be watched on any conventional television set or multimedia computer as a normal program. But if the viewer has a special interactive program box connected to the television, he or she can experience a fully functional interactive program. Each interactive viewer enjoys personalized audio responses and video graphics overlayed on the screen. The interactive program can be provided to television sets or to computers by cable, direct broadcast satellite, television broadcast or other transmission means, and can be analog or digital.

However, what is needed is an interactive presentation system for providing true video, audio and graphics interactivity with digital programs broadcast live. Such a system must efficiently package all the digital elements of the live interactive program at a centralized control studio and allow viewers at home to receive personalized interactive programming.

SUMMARY OF THE INVENTION

In accordance with the invention, there is provided an interactive digital system allowing the viewer active participation in selecting digital video streams, associated with different camera angles, for example, and integrated audio and/or graphics segments. Further, Web pages from Internet Web sites can be integrated into the program. The invention is particularly suited for the environment of live events, such as the broadcast of live sporting events. The viewer can appear to direct the camera shots by instantly changing among various camera angles, choose player interviews, or display associated statistical data on the team or players via graphics. In this manner, the system allows the individual subscriber to act as if he or she has control over how the program is directed and presented on their personal television set. In addition to selecting different camera angles, various audio options, closeups, slow motion, replays, graphics overlays, graphics or audio from Web sites, etc., are all possible. Further, games can be integrated with the live sports programming to increase viewer interest.

Thus, viewers can customize the content of programs. The interactive digital programming of the present invention is particularly advantageous for viewing live sporting events. Viewers are not limited to selecting from multiple camera angles, but may also call up player statistics on demand, listen to selected player interviews, etc. Cameras can be focused on different segments of an event. Further, video options could include video replay, slow motion effects, isolation on a particular player or group, etc. Changes are seamless, thereby adding to the effect that the viewer is directing the television show just as a director now does from a control room.

This "director" role by the viewer is possible due to the interactive technology of the present invention and also due to the digital compression and transmission scheme which allows for much greater information throughput over a given bandwidth, allowing viewers to choose from angles that are already available but presently cut by the director.

The digital interactive system is based upon branches which occur in the course of the full-motion video. Branches are real-time parallel paths that may be other full-motion video segments, graphics which are integrated into the video, audio segments, and/or retrieved Web pages which are integrated into the live event.

Sometimes, the interactive digital system will act upon the viewer's response immediately; other times, it will utilize ACTV's unique "profiling" concept to act upon the response later. This technology enables the system to "remember" the viewer's responses and desires, and integrate them into the video, audio, graphics and/or Web site information at a later point. For example, the viewer could specify at the beginning of a football game to isolate the offensive quarterback of a particular team. Thus, whenever the team of choice is on offense, the video isolation of the quarterback is displayed to the viewer automatically. Or, based on how a viewer has selected camera angles, replays, etc., over the past five minutes, the system acts to mimic these selections at later times during the program. The system of the present invention "learns" from the viewer how they want to view the game, and thus, continues viewer selection sequences made earlier.

At the source, the present invention comprises a plurality of video cameras, each of the video cameras relaying a different predetermined view of an event. The video signals corresponding to the different cameras are forwarded to a central control studio. Further, one or more audio signals or graphic statistical overlays can be collected and sent to a central control studio. After receiving the video, audio, and graphics signals at the central control studio, these signals are digitized and compressed in digital video and audio compressors. These signals are then combined with special data codes into a "digital package," and subsequently, transmitted over a cable distribution system. The special data codes are the keys to unlocking the interactive potential of the program.

The digital program signals are transmitted to a receive site by any suitable transmission means. Once received by a receive antenna, the digital program signals are passed along on a digital cable television distribution system to the viewer homes. Further, some other signals or commercials can be inserted at the local head end. The signals are received and processed in a digital cable box. Selections of the video, audio, graphics display and/or Web pages can be made as a function of immediate viewer entries, or to interrogatory responses presented at the beginning or during the program, or based on a prestored viewer profile. Once a decision is made to switch from one video option to another video option, the digital switch is performed seamlessly.

As mentioned above, the program at predetermined times or immediately upon user entry can retrieve and branch to informative segments from Web sites. For example, a viewer watching a sporting event, through the system of the present invention, can receive a stream of Web pages which provide additional, specific information relating to a favorite player, team or perhaps the remaining schedule for the sports team, as examples. In addition, users can take advantage of the two-way capabilities of the Internet to respond to polls or to link to additional sites.

Another Internet-based application allows advertisers to speak more directly to consumers by directly sending Web pages to the consumer instead of merely displaying Web addresses in their commercials. The particular advertising information from Web sites can be targeted to viewers based on the viewer profile, stored either in the digital set top box or at the cable headend. Alternatively, Web site access can be initiated by the viewer by simply clicking on the remote during the commercial. Thus, viewers have the capability to individually select Web sites if they want more information from advertisers, for example.

The video programming and corresponding Internet pages can be viewed either on personal computers equipped with a television card on special digital cable boxes with stored interactive Internet application software providing Internet access, or on digital television sets, all of which would utilize the specialized TV/Internet software of the present invention.

The present invention also has applications for other types of programming. For example, viewers can direct the scenes of a murder mystery. Switching from one scene to another can be done seamlessly without noticeable effect on the viewer. Further, the present invention can be used for any kind of live or pre-recorded event. For instance, a music concert or a political convention can be enhanced in the manner of the invention.

Accordingly, a primary objective of this invention is providing an enhanced digital live program allowing the display to be tailored to the user's desires, choices or interests.

It is an object of this invention to personalize and enhance live sporting events for the viewer.

DETAILED DESCRIPTION OF THE INVENTION

The present invention is an interactive digital system 1 for producing a powerful personalized program allowing the home viewer an expanded set of programming options. Digital TV streams are put into digital packages made up of video, audio, data codes and graphics, and are used to provide personalized responses to viewer selections. Such responses can be further enhanced by allowing access to Internet Web sites 170. In this manner, sports such as golf, football, baseball, basketball, etc. can now be watched with greater interest and involvement. However, even further enhanced interactivity is possible with the present invention due to the provision of various profiling and memory features.

Figure 1:
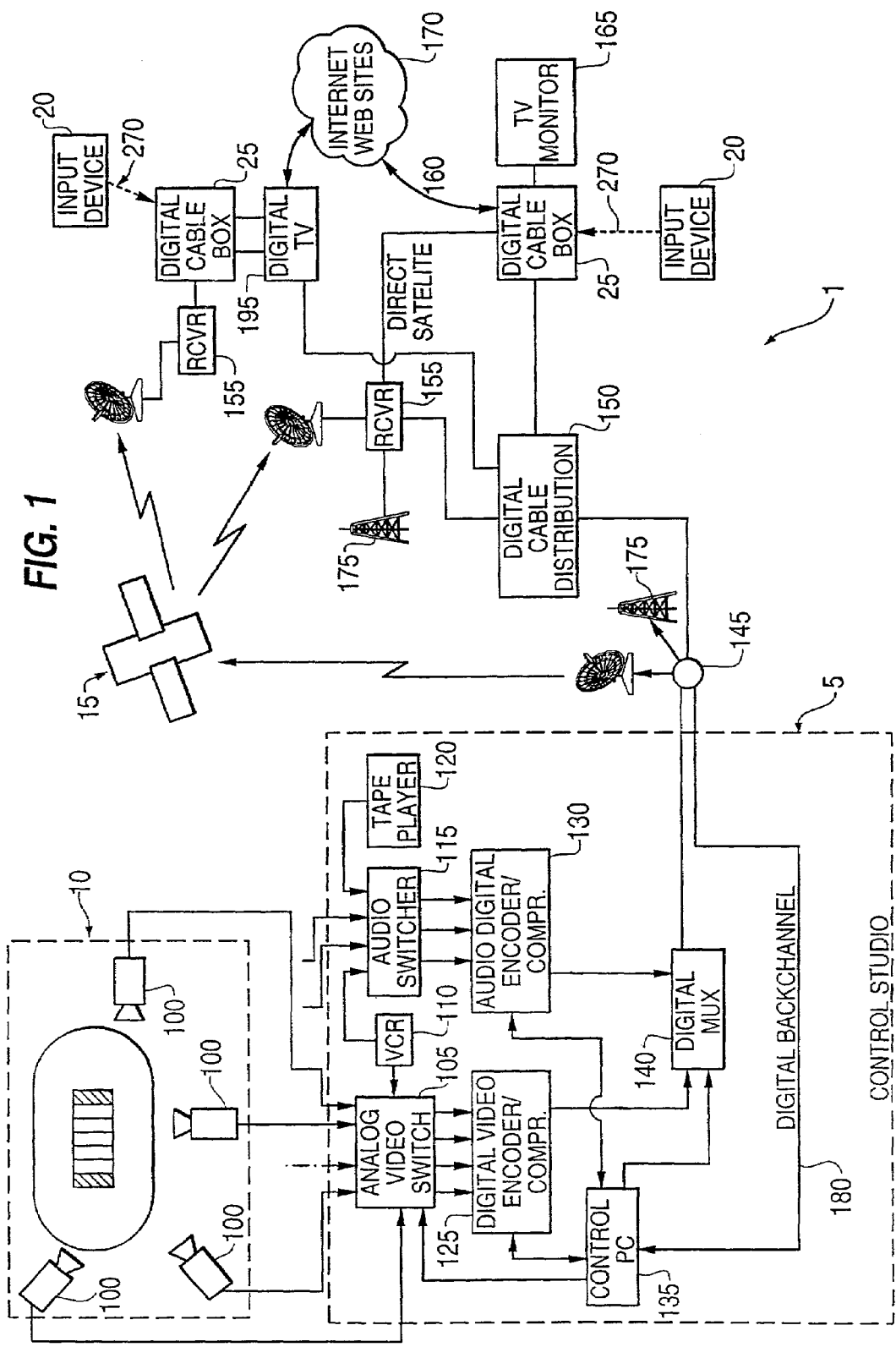
FIG. 1 is a diagram of the network and equipment for providing live digital programming.

As shown in FIG. 1, the present invention begins with the gathering of several possible video streams by way of cameras 100, strategically located at a sporting event 10, for example. Currently, many cameras 100 are employed at a sporting event 10. Super Bowl coverage, for example, typically encompasses 25 to 30 cameras. These live video streams can be integrated with recorded video streams which, for example, could include highlights from the current game or past games, player profiles, etc. To describe the components and operation of the present invention, the production and transmission of a live sporting event 10, i.e., football, is chosen to present the invention features. However, other applications can be appreciated by the reader, including several disclosed below.

A. The Control Studio

The interactive broadcast program is prepared at the control studio 5 into digital packages. The control studio 5, as shown in FIG. 1, allows a producer to create and introduce interactive elements during a live broadcast. In one preferred embodiment, the producer pre-records a set of interrogatories or instructions for the user. These interrogatories may include such questions as the following:

SELECT THE CAMERA ANGLES/OPTIONS THAT YOU PREFER:
 OPTIONS: END-ZONE
 FIFTY YARD LINE
 FOCUS ON THE QUARTERBACK
 FOCUS ON THE DEFENSE
 FOCUS ON THE CHEERLEADERS
 PROVIDE HIGHLIGHTS
WHO IS YOUR FAVORITE TEAM IN THE GAME?
 OPTIONS: BLUE TEAM
 RED TEAM
WHO IS YOUR FAVORITE PLAYER IN THE GAME?
 OPTIONS: RED RUNNER
 BLUE QUARTERBACK
 BLUE DEFENSIVE END
 RED QUARTERBACK
 ETC.
ARE YOU INTERESTED IN RECEIVING STATISTICAL SUMMARIES?
WOULD YOU ENJOY LISTENING TO PLAYER INTERVIEWS DURING THE GAME?

Such interrogatories can be presented to the viewer at the beginning of the broadcast or scattered throughout the program. Interactive responses to such interrogatories would include video, audio and graphics personalized to the particular viewer. The preparation of the graphics for presenting such interrogatories occurs off-line at the control studio 5 using chyron or any graphics language. These interrogatories or instructions will ultimately be displayed to the home viewer, preferably in the form of graphics, to facilitate the interactive responses. The producer creates these graphic video slides of questions on a computer using the text editor and chyron. Associated with each question, the producer enters a number of possible viewer options. Then, the producer relates each possible user entry to one or more corresponding interactive responses. If the response is information from an Internet Web page, the producer will indicate the particular Uniform Resource Locator (URL) of the Web page. The producer sets a time stamp for when each particular question will appear during the program. As explained below in more detail, the viewer response to a query will be used to direct which video (and/or audio, graphics, or Web page) option will be provided to the viewer. In the present invention, the interactive response to the query can occur immediately following the entry of the viewer entry or at some predetermined later time in the program using "trigger points," 500 as explained in detail below.

With respect to the video segments, cameras 100 are preferably trained on different segments of the sporting event 10. As is common with broadcasts of a football game, for example, cameras 100 could be located in the endzone, press box, the field and at various other locations throughout the stadium. Further, various video options can be created including video replay, slow motion, isolation on cheerleaders, particular player or group of players. Instant replays are created by delaying the live feed for a certain number of seconds. These video streams are sent to a control studio 5. The control studio 5 contains the necessary equipment for packaging the program for delivery to the viewers. The studio 5 contains a video switcher 105 which receives the live signals from the cameras 100 by way of various input lines. Further, lines carrying recorded video streams from one or more VCRs 110, computers or CD players feed into the video switcher 105. The video switcher 105 also receives video inputs from the control computer 135. Further, various graphics screens, depicting, for example, sports team or player statistics can be designed with the control personal computer 135 and forwarded to the digital video switch 105. The producer, via the control PC 135, directs which video options to pass through the video switcher 105. At the output of the video switcher 105, each of the different output video streams access a separate encoder 125 and are all GENLOCKED, so that each video stream is synchronized with the other video streams.

After encoding, the video streams are input into a video compressor 125. Preferably, the digital compression scheme is MPEG-2. Preferably, 64 Quadrature Amplitude Modulation (QAM) is used as the modulation scheme. In this digital embodiment, four channels of digitally-compressed video content would carry about 27 Mbps using 6 MHz of bandwidth. Alternatively, if 256 QAM is employed, seven-to-one video compression can be achieved with the MPEG-2 scheme. While MPEG-2 is the preferred compression scheme, the signals can be compressed according to any known standard including MPEG-1, JPEG, or other DCT coding scheme, wavelets, fractals or other transform or waveform based technique.

The control studio 5 also contains an audio switcher 115 which receives live audio signals from microphones or recorded audio from tape players 120, CDs, VCRs 110, etc. The control computer 135 sends commands to the audio switcher 115 directing which audio options should pass through the switch 115. Further, in the audio switcher 115 the various audio signals can be aligned to match the various video signals in time. In addition, VCR audio output is received by the audio switcher 115. The present invention can accommodate any number of audio signals as output from the audio switcher 115, as directed by the producer. The audio outputs are received by an digital audio encoder/compressor 130. The audio signais are then preferably sampled, encoded and compressed in the digital audio encoder/compressor 130. The encoding technique can be a waveform coding technique such as PCM, ADPCM or DM. Alternatively, the signals can be encoded using synthesizer or encoder techniques such as MUSICAM, Linear Predictive Coding (LPC), Adaptive Predictive Coding (APC), and Sub-band coding. Generally, the transmission rate is about 256 kbps per audio for the stereo pair.

The timing and control for integrating the various multimedia elements is provided by the ACTV authoring language, a unique set of interactive data codes to facilitate the interactive process. The data codes are stored in memory in the control computer 135 as part of the ACTV programming language. The codes comprise commands, or branch codes, for branching between interactive options, timing signals for controlling the interactive program, data or text, commands for termination and initiation or interactive program viewing, or triggers for executing macros. Preferably, these commands are output from the control computer 135 and multiplexed with the video streams in the MPEG-2 compressor 125, as shown in FIG. 1. Interactive options that can be branched to based on the branch codes include video segments, audio segments, graphics segments and/or identified Web pages.

There are several commands in the ACTV authoring language that function to provide the interactive sports programming applications. These commands are explained below in Section D, which details programming applications.

B. The Transmission System

As shown in FIG. 1, the digital interactive system 1 uses an interactive program delivery system with any transmission means including satellite 15, cable 150, wire or television broadcast 175 to deliver the interactive program (hereinafter "composite interactive program") from the control studio 5 for distribution to subscribers in their homes. At the control studio 5, the signals from the digital multiplexer 140 are converted to RF and distributed to a microwave 175, cable 150 or satellite 15 network. Preferably, the digital interactive signal is forwarded from the control studio 5 to a cable headend 150, and subsequently, sent to the homes via the cable network.

The program is preferably the broadcast of a live event. For example, live sporting events with added interactive elements can be broadcast from the control studio 5. Such live interactive elements could be different camera angles 100, slow motion video, etc., as discussed above, while also incorporating prerecorded interactive segments such as highlights. Alternatively, the program can be produced off-line and stored in a program storage means at the control studio 5.

In a satellite broadcast transmission, the digital interactive signals are transmitted to uplink equipment where they may be multiplexed, upconverted, modulated, amplified and transmitted by satellite 15 to the receiver site 155 for distribution to the homes.

At the reception end, the composite digital interactive signals enter a receiver 155 where the signals are demultiplexed, downconverted, demodulated and then passed to a cable distribution system that directs the signals to the homes. Although a cable distribution system 150 is the preferred transmission media to the homes, the digital signals may also be distributed by any conventionally known technique including satellite 15 to digital satellite receivers 155 at the home, fiberoptics, low or high power broadcast television 175, telephone lines, cellular networks, and similar technology can be used interchangeably with this program delivery system.

C. The Interactive Digital Box

Figure 2:
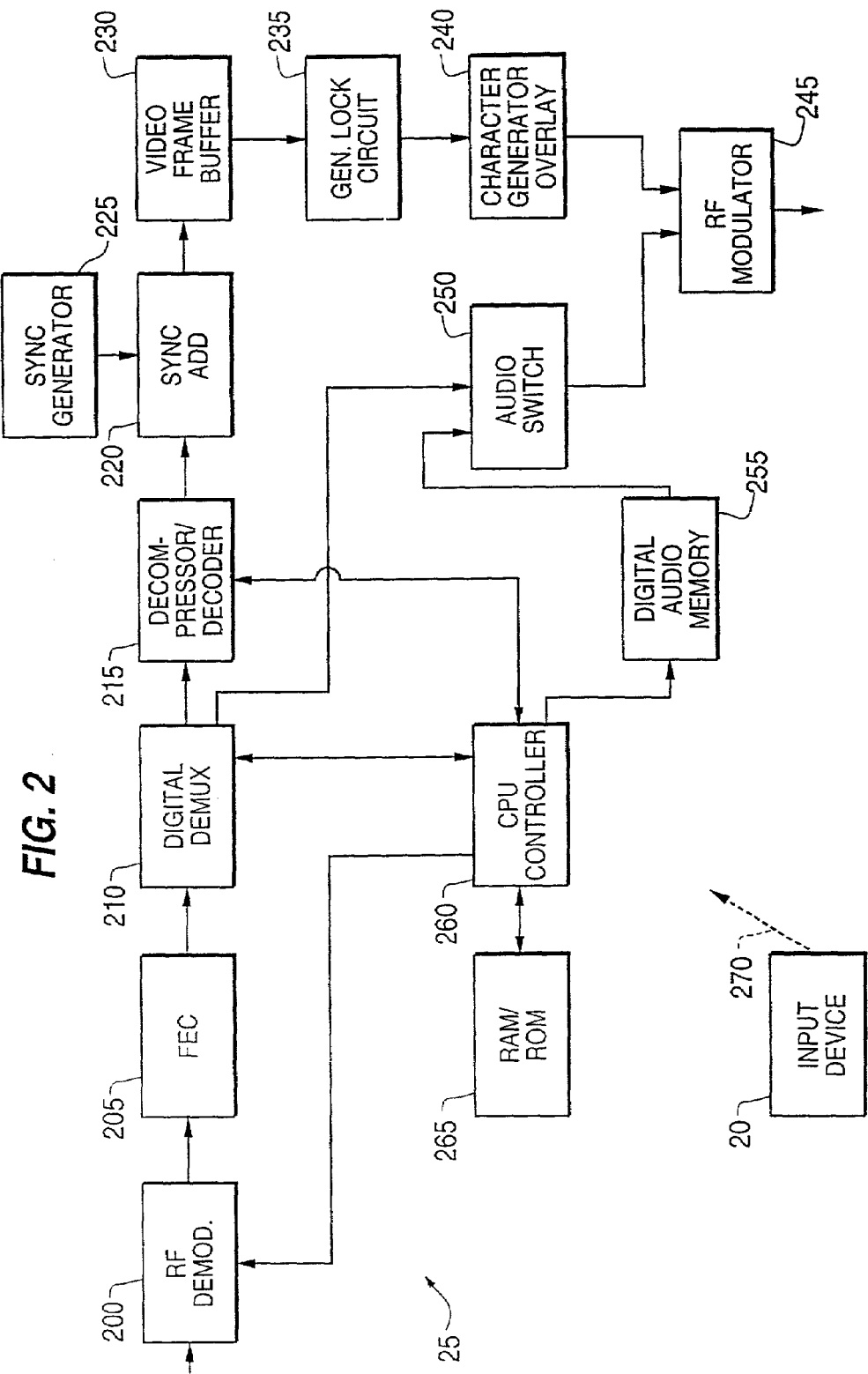
FIG. 2 is a block diagram of an interactive digital cable box allowing seamless switching between video signals.

The interactive digital box 25 is shown schematically in FIG. 2. Preferably, the interactive digital box is a specially adapted digital cable box 25. The controller 260 determines what video, audio, graphics and/or Web pages to display based upon the interactive commands which it receives. Based upon the commands, it plays the appropriate video, audio, graphics or Web page options. The graphics can either be created and sent from the control studio 5 or the graphical images can be created at the interactive digital box 25 based on instructions preferably in the interactive commands. The interactive digital box 25 connects to a television 165 or other display monitor. Further, the interactive digital box 25 can be connected to a digital television 195, in which case an RF modulator 245 is not necessary. Each downstream transmission reaches the subscriber's house, shown in FIG. 2, preferably through a tap and drop cable.

The user interacts with the program through the input device 20. Preferably, the input device 20 is a typical television remote. The user interface 270 may be an infrared, wireless, or wired receiver that receives information from the input device 20.

Regardless of the type of input device 20, user inputs can be utilized by the present invention immediately, or at a later time, to result in personalized graphics, video and/or audio presentation. For example, the present invention utilizes "trigger points," 500 as described below, to enable subsequent branches among multimedia segments during the show.

Certain commands are sent from the control studio 5 as part of the digital interactive programming to facilitate the collection of user entries. These commands are extracted at the digital demultiplexer 210 and sent to the controller 260 which performs the appropriate action based on the commands. Some of these commands are explained below.

a. Begin Input Extended

The Begin Input command starts an input period during which the user may press one or more buttons to select his or her choice(s). The entry format of this command is set forth as follows:

BEGIN INPUT {{N} {VALID KEYS} {DIFFERENT} {FEEDBACK} where:

| | |
|---|---|
| N | The maximum number of keys that can be pressed. |
| KEYS | The valid keys that can be pressed. |
| DIFFERENT | Requires each key pressed to be different. |
| FEEDBACK | The feedback type provided to the viewer. | b. Begin Video Choice Extended

The Begin Video Choice begins an input period for disco mode. During disco mode, the video switches dynamically each time the viewer makes a selection.

BEGIN_VIDEO_CHOICE MODE [KEYS] {FEEDBACK [AUDIO]}

The disco mode allows the viewer to change channels at will, while the OneShot mode allows only one change of channel.

MODE DISCO/ONESHOT

KEYS The valid keys that can be pressed.

FEEDBACK The feedback supplied to the user for the key(s) which are pressed.

The mode Disco allows the viewer to change channels at will, while the OneShot mode allows only one change of channel.

c. Begin Audio Choice Extended

The Begin Audio Choice begins an input period for disco mode.

BEGIN_AUDIO_CHOICE MODE [KEYS] {FEEDBACK [AUDIO]}

MODE DISCO/ONESHOT

KEYS The valid keys that can be pressed.

FEEDBACK The feedback supplied to the user for the key(s) which are pressed.

d. Map

The Map command is used to map video or audio tracks to keys, for use in connection with the Begin Audio Choice and Begin Video Choice commands. If this command is omitted, Key 1 will map to Track or Channel 1, Key 2 to Track or Channel 2 etc. This command allows mapping any key to any channel.

MAP KEYS [TRACKS [T1, . . . TN/T1-TN] CHANNELS [C1, . . . CN/C1-CN]]

The map statement maps audio tracks or video channels to keys, to enable audio or video choice commands to effect changes to tracks other than the default tracks, which are that key 1 maps to track 1, key 2 to track 2, etc.. All the choice statements after a map statement will cause the tracks, video tracks or channels to be changed to those specified in the map statement. The acceptable numbers for the map command are from 1 to 8, for keys, video channels and audio channels.

Other commands include those which allow for the following applications: (1) viewer profiling, to enable the set top box 25 to "remember" viewer preferences; (2) uploading viewer responses to a central location; (3) downloading of text and graphics, for display using the graphics chip of the set top box 25; (4) the ability of the viewer to prepare his own video, based upon his selections of camera shots 100 and audio, which can be stored and replayed for the viewer.

The interactive digital box 25 of the present invention enables seamless flicker-free transparent switching between the digital video signals. "Seamless" means that the switch from one video signal to another is user imperceptible. Because the video signals are running off the same clock, the interactive digital box 25 is capable of providing a seamless digital switch from one video signal to another signal. The program clock reference necessary for the box to make this seamless switch is preferably embedded in the signal header.

As shown in FIG. 2, a CPU 260 is connected to an RF demodulator 200 and digital demultiplexer 210. The CPU 260 directs demodulation and demultiplexing of the proper channel and data stream to obtain the correct video signal. Seamless switching can occur with MPEG-2 compressed signals since there are points within the frame wherein seamless switching can occur. Preferably, switches occur at an "I" frame, assuming the use of MPEG-2 compression. The selected video signal is determined either by examination of the user's input from user interface 270 and/or any other information or criteria (such as personal profile information) stored in RAM/ROM 265. For example, the RAM/ROM 265 could store commands provided within the video signals as discussed in U.S. Pat. No. 4,602,279, and incorporated herein by reference.

The RF demodulator 200 demodulates data from the broadcast channel directed by the controller 260. After the data stream is demodulated, it passes through a forward error correction circuit 205 into a digital demultiplexer 210. The demultiplexer 210 is controlled by the controller 260 to provide a specific video signal out of a number of video signals which may be located within the data stream on the demodulated broadcast channel. The demultiplexed video signal is then decompressed and decoded by decompressor/decoder 215. The video signal is synchronized by a sync add circuit 220 and a sync generator 225. The video signal is then buffered by a video frame buffer 230. The buffered video signal is modulated by a modulator 245 into a NTSC compatible signal. Such a modulator is not necessary if the selected signal is sent to a digital television 195.

By using a video frame buffer 230 and delaying the viewing of a given signal, enough time is allowed for the decompressor/decoder 215 to lock onto, decompress, convert to analog, and wait for the resultant vertical interval of a second video signal. For example, assume video signal A is currently being processed and transferred through the circuit shown in FIG. 2 and displayed. Based upon a user selection, the controller 260 directs the digital demultiplexer 210 and RF demodulator 200 to switch to another video signal, video signal B. To accomplish this, the analog video from the first digital video signal, video signal A, complete with video sync, is fed into video frame buffer 230. This buffer 230 can hold the full video picture for "n" number of frames after which the signal is output to the display. In effect, a delayed video signal A is viewed "n" number of frames after the signal has been received. When the user selects a different video path by means of pressing a button on a keypad or entry by other means, the controller 260 instructs the digital demultiplexer 210 to stop decoding signal A and lock onto signal B to begin decoding signal B instead of signal A.

While this is happening, even though the decompressor/decoder 215 is no longer decompressing video signal A, the display is still showing video signal A because it is being read from the buffer 230. As soon as decompressing and decoding occurs, the controller 260 looks for the next vertical blanking interval (VBI) and instructs the video frame buffer 230 to switch to its input, rather than its buffered output at the occurrence of the VBI.

Since the RF demodulator 200, forward error corrector 205, digital demultiplexer 210, and decompressor/decoder 215 require a certain time period to decompress and decode the video signal B frame from its data stream, the size of the buffer 230 has to be large enough so that this processing can take place without interruption during the switching of the video signals. If desired, the system may continue to use the buffer in anticipation of a future switch. By using the controller 260 to manipulate the fill and empty rate of the buffer 230, the buffer 230 may be rapidly filled with video signal B frames and then after a period of time will be reset and ready to make another switch to another video in the same manner. The buffer 230 may also be reset by skipping frames or providing a delay between sequential frame outputs for a short time in order to fill the buffer 230. If a delay is used to maintain video signal or frame output while the buffer 230 is being filled, a slight distortion may occur for a brief amount of time.

Because a first video signal is always displayed as the output of the buffer 230 after the delay, the buffered video masks the acquisition and decoding of a second video signal. As long as the buffer 230 is large enough to keep the first video running while the second video is being decompressed and decoded, a seamless switch will occur.

While the digital interactive box 25 of FIG. 2 provides video interactivity, audio and/or graphics interactivity is also provided. For example, if, based on the viewer profile or viewer response to query, it is determined that the viewer's primary language is Spanish, then that viewer could obtain Spanish commentary to the football, soccer, etc. game. Alternatively, if a viewer has a favorite athlete, the audio can switch to an interview with the athlete during a segment of the broadcast. Multiple digital audio options forming a set of suitable responses to an interrogatory message can be sent as part of the composite digital signal. As set forth in U.S. Pat. No. 5,585,858, herein incorporated by reference, there are a number of different ways to effectively forward the necessary audio options for a given live event to the digital interactive box 25. With the present invention, it makes no difference how the audio options reach the digital interactive box 25, as long as they are available for selection and play at the appropriate times.

In FIG. 2, the digital demultiplexer 210 extracts the digital audio signal(s) and forwards them to the audio switch 250. Additional audio options are available from the digital audio memory 255. At certain times during the program, the data codes will identify the selection of a particular audio option corresponding to previous user inputs. The controller 260 calls the appropriate audio options from internal memory 255 or directs the audio switch 250 to select a predetermined audio segment received as part of the received digital signal for passage to the RF modulator 245 for play to the subscriber. At the end of the audio segment time period as indicated by the data codes, the controller 260 instructs the audio switch 250 to again pick up standard audio.

The digital demultiplexer 210 sends the extracted graphics data or ACTV data codes to the controller 260. The controller 260 interprets the extracted data as either control data, including instructions for switching between video signals, audio signals, or graphics data for on-screen display. If the data is on-screen display data, the data is preferably prefixed by a command designating the data as on-screen display data, as opposed to control data. Further, the controller 260 also examines the control data for the occurrence of a header code designating the onset of a trigger point 500 in the program, explained below.

Figure 3:
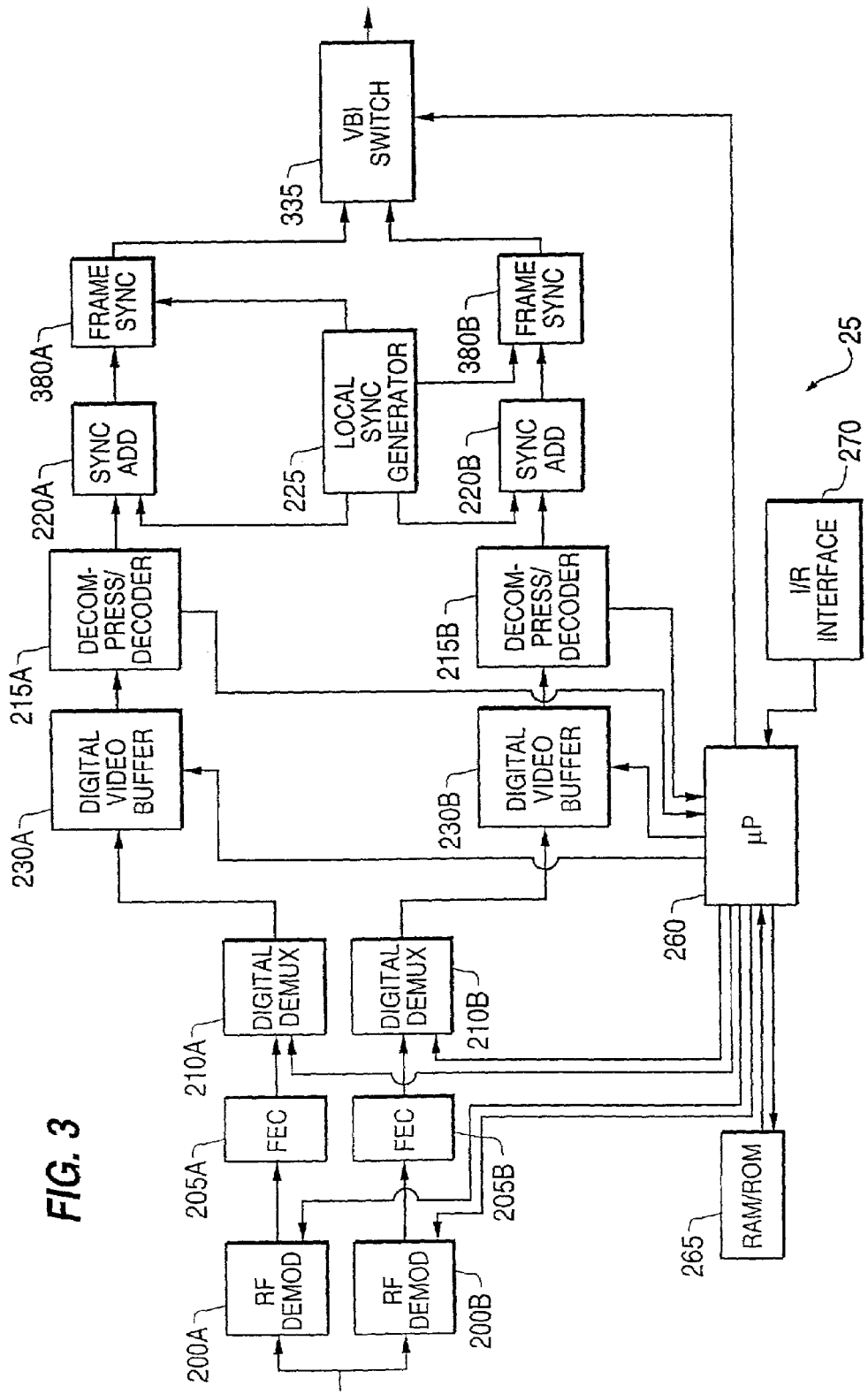
FIG. 3 is a block diagram of an alternative dual-tuner interactive digital cable box allowing seamless switching between video signals.

FIG. 3 shows an alternate, dual tuner embodiment for seamless switching between separate video signals. This embodiment presumes that two 6 MHz channels are used, each of which comprises compressed digital video and audio streams. In this embodiment, the microprocessor 260 controls the selection of the RF channel that is demodulated by RF demodulatois 200A, 200B. The demodulated data streams enter the forward error correctors 205A, 205B. At the output of the forward error correctors 205A, 205B the data streams are transmitted to the input of the digital demultiplexers 210A, 210B.

As with the RF demodulators 200A, 200B, the digital demultiplexers 210A, 210B are controlled by the microprocessor 260. This configuration allows the microprocessor 260 to independently select two different individual time-multiplexed video signals on different channels and data streams. If all the video signals of an interactive program were contained on a single channel or data stream, it would only be necessary to have a single RF demodulator 200, forward error corrector 205, and digital demultiplexer 210 serially connected and feeding into the two digital video buffers 230A, 230B.

Two data streams are provided from the digital demultiplexers 210A, 210B. One data stream carries video information pertaining to the video signal the user is currently viewing. The second data stream carries the video signal selected based on the user's previous and/or current interactive selections from the user interface 270, as determined by the microprocessor 260.

The digital information on each of the two streams is buffered in digital video buffers 230A, 230B. The buffered signals are then decompressed and converted into analog signals by decompressors/decoders 215A, 215B which include digital to analog converters. The decompressors 215A, 215B are preferably MPEG-2 decoders.

A local sync generator 225 is connected to sync add 220A, 220B and frame sync 380A, 380B circuits. Because both streams are synchronized based on signals from the same local sync generator 225, each stream becomes synchronized to the other. In particular, the signals on each stream are frame synchronized.

A vertical blanking interval (VBI) switch 335 is connected to the microprocessor 260 so that the input may be switched during the vertical blanking interval of the current stream, resulting in a seamless switch to the viewer.

The embodiment of FIG. 3 operates as follows. Based on user responses and control codes, it is assumed that the microprocessor 260 determines that a switch from video signal A to video signal C should be performed. The RF demodulator 200A and digital demultiplexer 210A are processing the currently viewed video signal, video signal A, which is progressing through the upper branch components. A command is issued from the microprocessor 260 to the RF demodulator 200A, 200B commanding a switch to the channel and data stream on which video signal C is located. The microprocessor 260 also instructs the digital demultiplexer 210B to provide video signal C from the received data stream to digital video buffer 230B.

At this point, the upper RF demodulator 200A and digital demultiplexer 210A are still independently receiving and processing video signal A, which continues through the upper branch of the circuit.

At a certain point, the digital decompressor/decoder 215B in the lower branch will begin filling up with video signal C frames. After video signal C is decompressed and decoded, it is converted into analog. A local sync generator 225 inserts both local sync and frame sync to video signal C via sync add circuit 220B and frame sync circuit 380B in order to synchronize it with the currently displayed video signal A, which is still being provided from the upper digital video buffer 230A. At the appropriate switch point, triggered by programming codes supplied with each video signal A and C, the microprocessor 260 directs the VBI switch 335 to switch in the vertical blanking interval from video A to video C, at which time video C will then seamlessly appear on the computer screen.

Digital video buffers 230A, 230B maybe used in the circuit of FIG. 3, but are optional. However, in an alternative embodiment the buffers would be required to provide a seamless switch if the FIG. 3 circuit was modified to incorporate a single RF demodulator 200, single forward error corrector 205, and single digital demultiplexer 210, each with a single input and single output. In this alternative embodiment, the circuit cannot independently receive and demultiplex two data streams on different frequency channels. One buffer 230A is used to store previously received video signals, while the other buffer 230B quickly passes through the selected video signals.

Based on the same assumptions above, video signal A is progressing through the upper branch of the circuit and it is desired to switch to video signal C. However, in this alternative embodiment, the digital video buffer 230A is providing maximum buffering to video signal A.

Because it is desired to switch to video signal C, the microprocessor 260 directs the alternative circuit (containing a single RF receiver 200, single forward error corrector 205 and single digital demultiplexer 210 connected in serial), to receive and demultiplex the data stream on which video signal C is located, which may be different than that of video signal A. When video signal C is demultiplexed, the microprocessor 260 directs the digital video buffer 230 to provide minimum buffering of video signal C so that decompressor/decoder 215 may quickly decompress and decode the digital signals. After decompression and decoding, video signal C is synchronized with video signal A. At this time, video signal A is read for display from digital video buffer 230A. The upper digital video buffer 230A must be large enough to provide video frames for output during the time it takes the RF demodulator 200 and digital demultiplexer 210 to switch to video signal C and the time required for decompression, decoding, and synchronization of video signal C.

When video signal C is synchronized with video signal A, the microprocessor 260 directs VBI switch 335 to switch from video signal A to video signal C in the vertical blanking interval of video signal A, thereby providing a seamless and flicker-free switch.

At this time, digital video buffer 230 will begin to utilize maximum buffering by altering its fill/empty rate as described above with respect to the FIG. 3 embodiment. When adequate buffering is achieved, a switch to another video signal may be performed in the same manner as described above.

Figure 4:
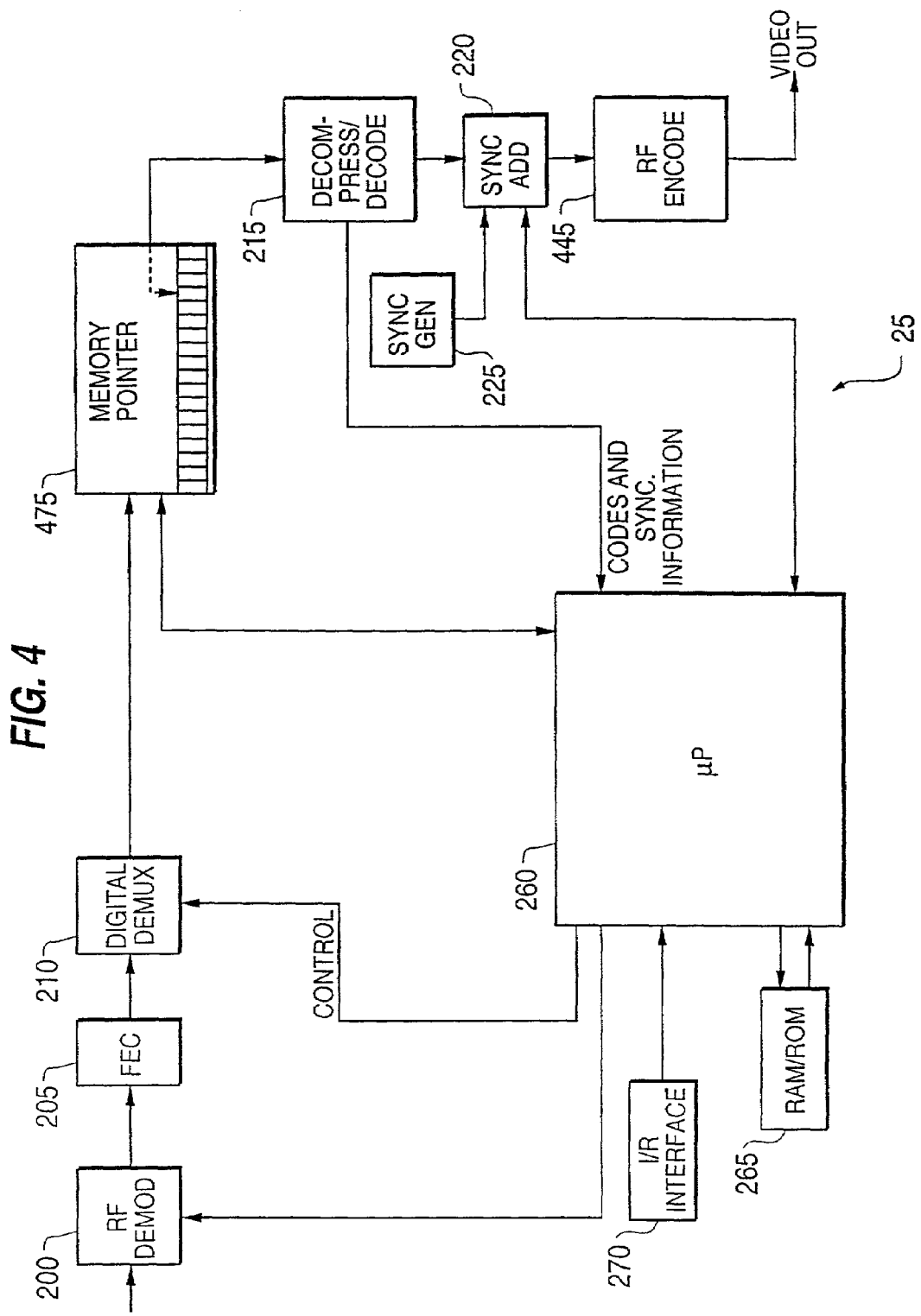
FIG. 4 is a block diagram of another alternative interactive digital cable box allowing seamless switching between video signals.

Another preferred embodiment is shown in FIG. 4. This embodiment also includes an RF demodulator 200, a forward error corrector 205, and a digital demultiplexer 210. However, the circuitry differs along the rest of the chain to the television set or monitor. In this embodiment, a memory 475 is incorporated and connected to the output of the demultiplexer for storing the compressed composite digital video signal. The decompressor/decoder 215 is inserted at the output of the compressed memory. The decompressor/decoder 215 decompresses the digital signal, converts the signal to analog and forwards the analog signal to the RF encode 245 for transmission to the monitor. Once the composite compressed digital video signal is fed into the compressed memory 475, the microprocessor 260 directs a pointer to be placed somewhere along the compressed digital video signal.

Based on the placement of the pointer, different frames and different segments of the composite digital video signal will be read from memory 475 for decompression and decoding.

The different video signals are distinguished from one another because they are labeled, preferably by headers. Assuming that video signal A has been selected for play on the monitor, the compressed digital memory 475 fills up with A frames. Assuming a switch to video signal C is desired, the microprocessor 260 directs the RF demodulator 200 and digital demultiplexer 210 to begin filling the compressed memory 475 with video C frames. The decoder 215 pointer begins to move down. As soon as a sufficient number of C frames have entered the compressed memory 475, the pointer will then jump to the beginning of the C frames. The C frames are then output into the decompressor/decoder 215 where the digital frames are converted into an analog signal.

The digital video is multiplexed in a series of easily identifiable packets. These packets may contain full compressed frames of video (I frames) or may include only the differences between full frames (B frames or P frames).

To be able to reconstruct the full video images, the decompressor/decoder 215 needs to have a minimum number of I, P and B frames. The decoder 215 needs only one I frame to decode an image. Conversely, two prior Anchor frames ("I's" and "P's") are necessary to decode B frames. In order to decode P frames, the decoder 215 only needs one Prior Anchor frame. When the microprocessor instructs the digital demultiplexer 210 to start sending packets from a different data stream there is no way to be certain that the next packet will be an I packet needed for decoding the second video stream. To avoid a breakup of the video images, which would occur if the decompressor/decoder 215 suddenly started receiving packets unrelated to the stream it was decoding, the microprocessor 260 starts to fill up the memory 475 with video signal C packets until it is determined that a full sequence of I, B and P frames are available. The decoder 215 should receive the last bit of the last B frame in a given, GOP (Group of Pictures) before the switch, in order to prevent glitches when decoding. Furthermore, the last B frame of the GOP must only be backward predicted, not forward predicted or bidirectional predicted. As soon as the valid sequence is in memory 475 the microprocessor 260 moves the memory read pointer to the start of a valid sequence of C video signal packets so that the decompressor/decoder 215 can successfully decode the C signals. This results in a seamless switch from video signal A to video signal C.

This embodiment requires a data channel for enabling a synchronous switch between a first video stream and a second video stream. This data channel comprises the ACTV codes which link together the different program elements and information segments on the different video signals. In addition, the data channel also comprises synchronization pulses and a time code to signify to the pointer the proper time to skip from a memory location representing one video signal to a memory location representing another video signal in order to enable a seamless switch.

The microprocessor 260 reads the data signal from the digital demultiplexer 210 and communicates pertinent data to the sync add circuit 220, which is connected to sync generator 225. The microprocessor 260 is then able to synchronously communicate with the memory 475.

The time code sent will identify the timing for one picture, as well as for multiple pictures, and will lock the different pictures together. This is done through the use of similar clocks at both the transmission end and the receiver. A time code is used in order to keep the two clocks at both the transmission and receive end synchronously connected to one another. Once the clocks at both ends are working synchronously, each of the multiplexed video streams must be synchronized to the clocks. In order to synchronize the multiplexed video stream to the clocks, each of the individual channels must be referenced to a common reference point and must be identified.

In the preferred embodiment, a packet header would be incorporated into the transport layer of the MPEG signal to identify the various channels. The packet header will also include information as to where to insert the vertical blanking interval. In MPEG, the vertical blanking interval is not transmitted from the headend. Therefore, the vertical blanking interval must be generated locally. The packet header eye will identify at what time the vertical blanking interval is in existence in order to effectuate a seamless switch between analog pictures.

In summary, the combination of clock and the information embedded in either the transport layer of MPEG or in a separate packet on a separate data channel effectuates the linking between each video signal and a corresponding time point. The data channel also includes information designating when all the various video signals will be in synchronism with one another. It is at these points that the microprocessor 260 may direct the pointer to skip from one location to another location, at a time (such as during the VBI) when a seamless switch will result.

D. Trigger Points

Figure 5:
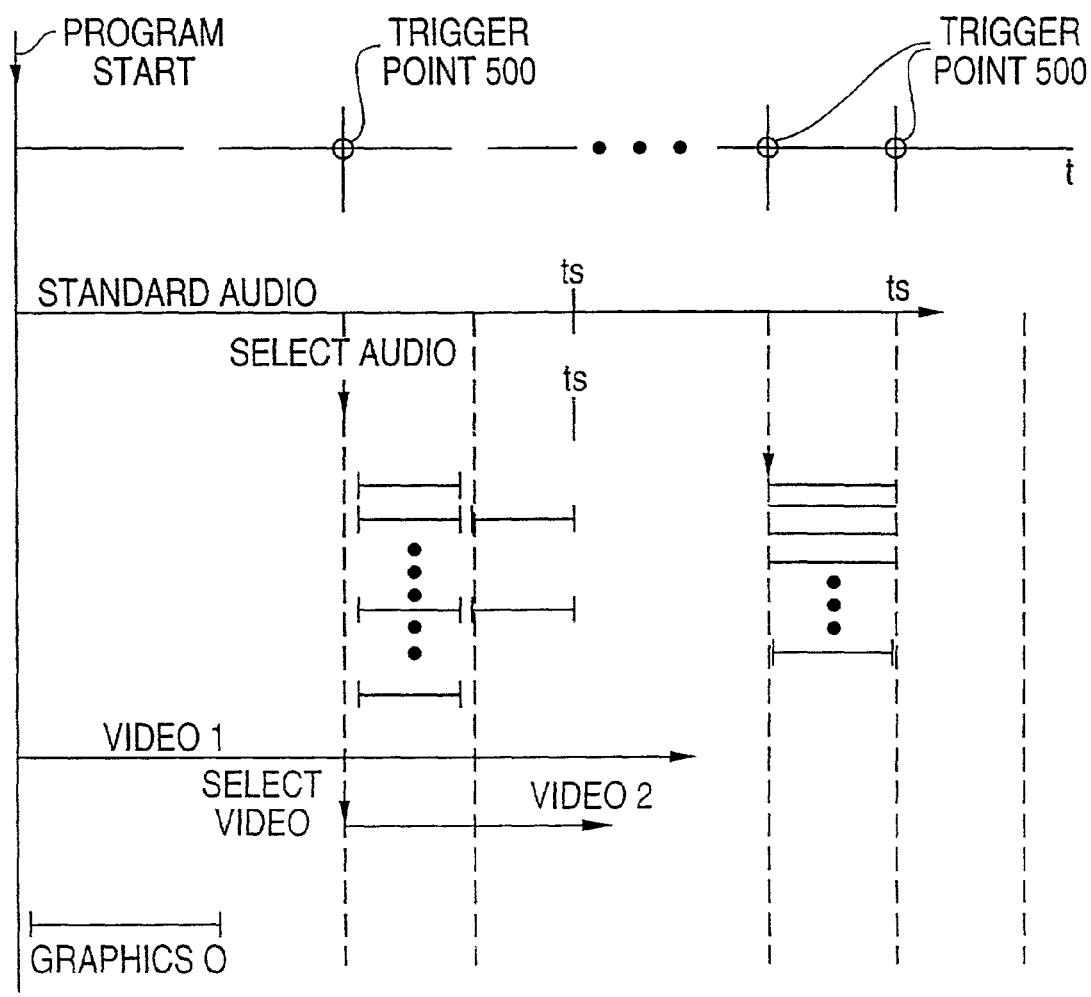
FIG. 5 is a time diagram showing a representation of trigger points and corresponding video, audio and/or graphics segments, one or a combination of which are selected for presentation to the subscriber immediately after the execution of the trigger point function.

Interactivity is further enhanced in the digital interactive embodiments through the application of trigger points 500 scattered at various predetermined times throughout the program, a timeline representation of which is shown in FIG. 5. The trigger points 500 correspond to times when interactive events are scheduled to take place during the live sporting event 10. These interactive events could be the selection and playing of video, audio segments, the display of graphics or display of Web pages accessed from Internet Web sites 170. For example, when a viewer's favorite baseball player is at bat, graphics showing past or current performance statistics of the player can be overlaid on the screen while excerpts from an interview with the player can be played for the viewer. While the choice of particular video, audio or graphics is still dependent on viewer selections, the viewer selections in response to displayed graphical interrogatory messages are preferably made during a period at the onset of the program or when a viewer first tunes into the program. Alternatively, interrogatories are not necessary if the switches are based on the viewer profile stored in memory 265. These viewer selections are then utilized as inputs to macros called up at later times during the program by the controller 260 upon the occurrence of the trigger points 500, identified to the interactive computer by unique codes embedded in the video signal.

The trigger points 500 correspond to the times when the conventional program content can be altered and personalized for the viewers. The programmer can place the trigger points 500 at any time throughout the program. Since the trigger points 500 are unknown to the subscriber, the subscriber does not know when they will receive a personalized message. In other words, an interactive response can either immediately follow a corresponding user selection made to an interrogatory message or occur at a later time corresponding to a trigger point 500, or any combination of the two. Of course, timing of the interactive events should correspond to suitable times in the program where branching to interactive elements is sensible and does not clash with the program content of the conventional video still displayed on the television 165 or other display monitor.

At the onset of a trigger point 500, the controller 260 will select one of several possible audio (or video or graphic display) responses for presentation to the subscriber. As mentioned above and shown in FIG. 5, some of the responses may comprise a branch to either a video segment, graphics and/or audio segments.

In combination with the use of trigger points 500, the present invention allows for the viewer to select certain options at the onset of the program to suit the viewers' preferences. For example, if the program broadcast is a live sports event 10, at an early trigger point 500, the viewer could be queried as to whether the viewer would prefer to receive audio in English, Spanish, French, or perhaps hear the local announcer instead of the network announcer. Upon the viewer selection, the CPU 260 directs a branch to the appropriate interactive segment.

Each trigger point 500 is identified preferably through the broadcast of ACTV codes sent as part of the composite interactive program signal. The codes preferably include, at a minimum, the following information: (1) header identifying the occurrence of a trigger point 500; (2) function ID (e.g., selection of audio or graphics responses, etc.); and (3) corresponding interrogatory message(s) or particular viewer characteristic or habit based on viewer profile. The first bit sequence simply identifies to the controller that a trigger point 500 is about to occur. The function ID designates the macro or other set of executable instructions for the controller 260 to read and interpret to obtain the desired result, e.g., a selected video and/or audio response.

Upon extraction of the codes by the data decoder, the controller 260 reads and interprets the codes and calls from memory 265 a particular user selection(s) designated by the trigger point 500 codes. The user selections correspond to subscriber answers to a series of interrogatory messages preferably presented at the beginning of the program. After obtaining the appropriate user selection(s), the controller 260 reads and performs the executable instructions using the user selection(s) as input(s) in the macro algorithm. The result of the algorithm is either a selected video stream, audio and/or selected graphics response. The video/audio response can be called from memory 265 if it is prestored, called from external data storage, or the controller 260 can command the switch to branch to the particular video audio stream if the response is broadcast concurrently with the trigger point 500. After the selected video/audio response is played to the subscriber, the switch branches back to the standard program, shown at time $t_s$ in FIG. 5.

As mentioned above, a series of interrogatory messages are preferably presented when the subscriber begins watching the interactive program. These interrogatory messages can be presented in any one of three ways. First, the interrogatory messages can be presented as graphics displays overlaid by the interactive computer workstation onto a video signal, wherein the graphics data is sent in the vertical blanking interval of the composite interactive signal, or alternatively stored on the hard disk or external storage. Second, the interrogatory messages are presented as graphics displays as discussed above, except the graphics data comes from local storage, external data storage (e.g., CD ROM, cartridge, etc.), or a combination of data in the VBI and data called from either local or external data storage. Third, graphics data can be presented in the form of user templates stored at the interactive computer workstation.

User selections corresponding to answers to the n successive interrogatory messages are received by the remote interface 270 at the beginning of the show, stored in memory 265 and used throughout the show at the appropriate trigger points 500 to subtlety change program content as the show progresses. Preferably, each interrogatory has a set of possible answers. Next to each possible answer will be some identifier corresponding to a label on a key on the user interface. The subscriber depresses the key corresponding to their answer selection. This selection is decoded by the remote interface 270 and controller 260, stored in memory 265, preferably RAM, and used later as required by an algorithm designated at a trigger point 500.

E. Internet

In addition to the central studio serving as a source of interactive option responses, the Internet can be used as a source of personalized information for interactive responses.

Figure 6:
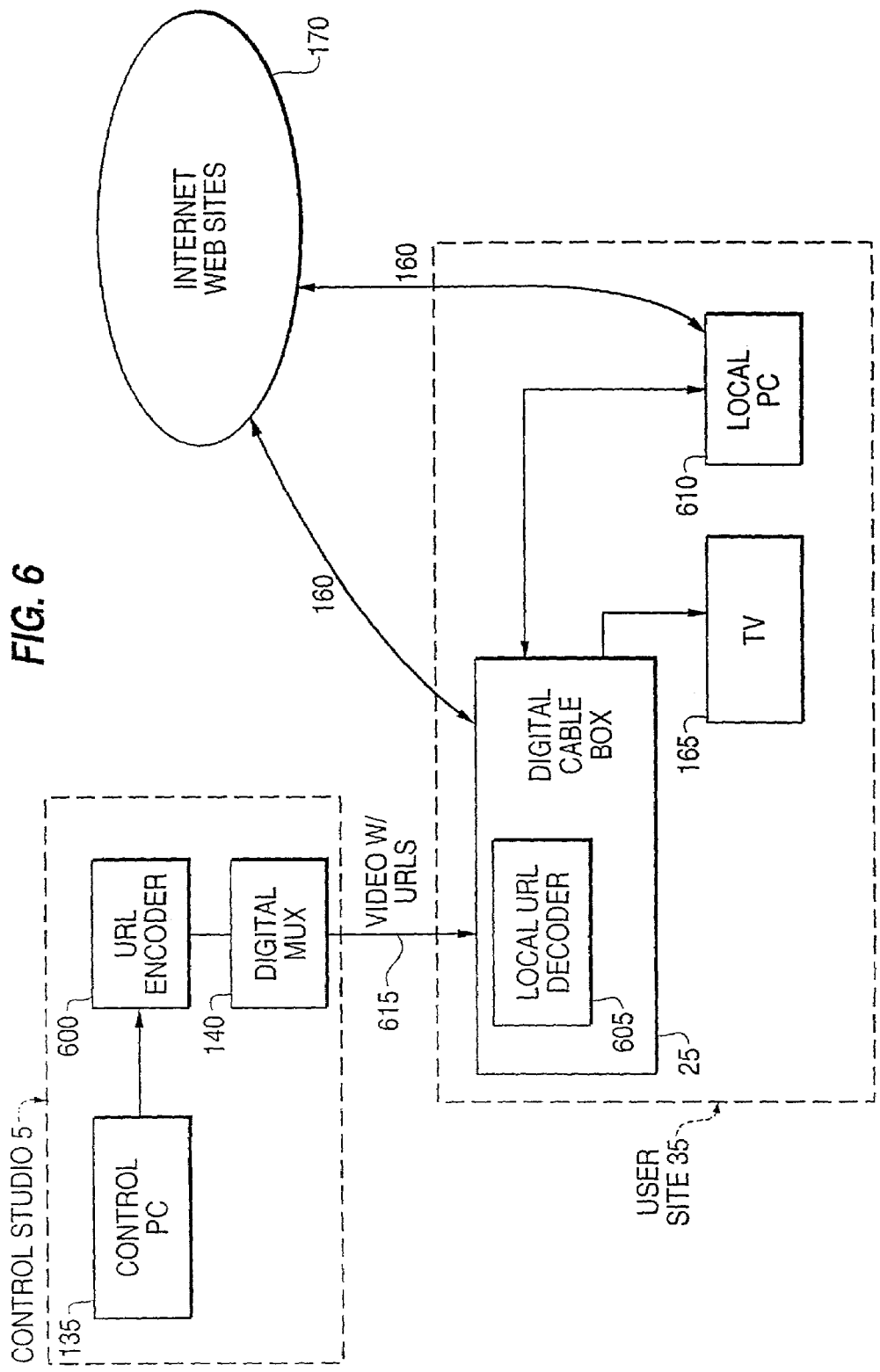
FIG. 6 is a block diagram of an alternative embodiment of the interactive system including Internet access.

As discussed above, the video programming is preferably created at a centralized location, i.e., the control studio 5 as shown in FIG. 1, for distribution to subscribers in their homes. Referring to FIGS. 1 and 6, in a preferred method, the operator at the control studio 5 must designate certain Web pages to correspond to one of the program options, such as audio and/or graphics options, using control PC 135 and URL encoder 600. Instead of encoding the actual content of the options at the control studio 5, as with the audio, Web address identifiers, i.e., Uniform Resource Locators (URLs) are encoded and sent as part of the data codes from the control PC 135 to the digital multiplexer 140. After multiplexing, the URLs are sent as part of the program signal 615, as described above. Preferably, the URLs, like the various audio and graphics options, have associated time stamps which indicate to the remote digital set top boxes 25 when, during the video program, to display the particular Web pages addressed by the URLs, the selection and display of which is preferably made as a function of viewer responses or viewer profile.

Preferably, each digital set top box 25 has an Internet connection 160 created concurrently with the cable connection. The Internet connection 160 can be via high-speed line, RF, conventional modem. The digital set top box 25 has Internet access 160 via any of the current ASCII software mechanisms. In a preferred embodiment, in the interactive digital set top box 25, the digital demultiplexer 210 extracts the URLs along with the other data codes. In an alternative embodiment, a local URL decoder 605 at the user site extracts the URLs.

In a preferred embodiment, a JAVA enabled browser as well as specialized software for performing part of the method of the present invention are installed on the interactive digital set top box 25. The JAVA enabled browser allows the interactive digital set top box 25 to retrieve the Web pages and is preferred software, since it is platform independent, and thus, enables efficient and flexible transfer of programs, images, etc., over the Internet. The specialized software acts as an interface between the video programming and the Internet functions of the present invention. The processor and software interprets these URLs and directs the JAVA enabled browser to retrieve the particular relevant Web pages, and synchronizes the retrieved Web pages to the video content for display on the television monitor 165 at the appropriate times.

In the present invention, the viewer also has the capability to link to a channel website at will. For example, if a viewer is interested in purchasing a product described in an advertisement, by merely clicking on a button on their remote 20, the producer's Website could be accessed by Internet connection 160 and displayed to the viewer. The viewer could then either obtain more information about the product or order the product, if desired. As described above, this application is possible by sending the URL associated with the producer's Website to the digital cable boxes 25 as part of the interactive program. Upon selection by the viewer, the web browser, located either in the digital set-top box 25 or externally in a connected PC 610, can retrieve the Web pages. The specialized software then synchronizes the Web pages for video display.

F. Memory

The interactive digital set top box 25 of the present invention also has the advantage of remembering subscriber responses and using these responses in choosing a video/audio response, and/or graphics interrogatory message, to present to the student. Memory branching is a technique of the present invention where the algorithm assembles video/audio responses and graphics interrogatory messages according to the current and previous user inputs. Memory branching is accomplished by linking video/audio streams and/or successive graphics interrogatory messages together in a logical relationship. In this scheme, the interactive digital set top box 25 contains logic (preferably, in the software algorithm) and memory 265 to store previous subscriber selections and to process these previous responses in the algorithm to control future video/audio stream selection, as well as future graphics message selection.

G. Digital Viewer Profiles

In a preferred embodiment, the interactive digital cable box 25 can have a "viewer profile" stored in its memory 265. Alternatively, the accumulated profile of viewer characteristics and/or habits can be stored at the control studio 5 or cable headend. If the profile statistics are accumulated at some central location, they can also be sent to each viewer's home. On the other hand, if accumulated in memory 265 at each of the set top terminals 25, the data could be sent to the central location for storage and dissemination by way of the digital back channel. Decisions regarding personalized advertising and viewing can then be made for a viewer or class of viewers based on the accumulated parameters.

The "viewer profile" preferably contains characteristics of the particular viewer at that subscriber location, such as sex, hobbies, interests, etc. This viewer profile is created by having the viewer respond to a series of questions. Alternatively, the viewer profiles could be created at a control studio 5 and sent to the interactive digital cable box 25. This information is then used by the cable box software to create a compendium of the viewer's interests and preferences—i.e., a user profile. The stored user profile would be used in place of the question/answer format, and thus, dictate the branches to interactive segments of interest to the viewer.

Alternatively, the interactive cable box 25 can be programmed to create a user profile of each viewer based on the selections made during one of the interactive programs. If the profile shows that a particular viewer does not enjoy violence, the system can automatically branch to another video signal at the commencement of a fight in a sports program. Furthermore, such a user profile could be modified or enriched over time based on selections made during future interactive programs. For example, the 'memory' technique described above can be used to modify the user profile based on user response over time.

Event data is collected from the viewer when the following command is received and processed by the controller 260 in the interactive digital cable box 25:

VIEWER PROFILE

This command is used to enable events which can be utilized for profiling during a show. The events indicated in this command are those profiling events which are possible during the show. The enabled events may be either selected by the viewer during the show, or may be automatically enabled based upon viewer selections.

VIEWER_PROFILE EVENT1, . . . EVENT24

Once the profile is created, the programming choices or interactive responses can be triggered based on the content of the viewer profile itself. For example, if the viewer profile suggests that the viewer is particularly interested in sports cars, a sports car commercial could be played for the viewer at a predetermined point in the program. As another application, if a viewer's profile indicates that the viewer is interested in cooking, whenever the viewer watches such a program, the user profile would trigger the interactive program to download recipes and either display such recipes on the screen or send the recipes to an attached printer.

Viewer profile information can then be collected at the control studio 5 through polling of the viewer cable boxes 25 for viewer selection data. Special polling software is loaded into the digital set top box 25 for performing the polling functions. Alternatively, the invention allows for the digital set top boxes 25 to send back data on command from the control studio 5 or periodically. The command to initiate an upload of viewer profile data is as follows:

UPLOAD EXTENDED

This command is used to initiate the uploading of data to the central site.

UPLOAD_EXTENDED UPLOAD_IDENTIFIER VARIABLE_NAME

[PHONE_NUMBER]

UPLOAD_IDENTIFIERnumeric constant identifying upload.

VARIABLE_NAME name of variable to be uploaded

PHONE_NUMBER string, that consists of numbers only. it can be omitted, if not needed.

Regardless of whether a polling or periodic scheme is used, the statistics and other user profile information is preferably sent back to the control studio 5 by use of the back-channel.

H. Applications

The embodiments, described above, allow for several possible applications. For example, in a live sports event 10, one channel could carry the standard video channel, with other channels carrying different camera angles 100 and/or close-ups of particular players. Other potential video options include instant replay, highlights, player statistics via graphic overlays, etc. Graphics presenting statistical information on the players can be constantly updated using the Chyron system.

The provision of trigger points 500, explained above, can provide for seamless integration of such video options during the sporting event, based on either the viewer responses to interrogatories at the beginning of the program and/or on the digital viewer profile.

Further, the viewer can become the director with the present invention. For example, the viewer can choose which camera angles 100 to emphasize. In a broadcast of golf, the viewer can direct whether they desire to follow a particular player from hole-to-hole, focus on one particularly difficult hole. In this manner, the viewer can customize the sporting broadcast to meet his own interests.

Further, the viewer can act as a director to create their own video. During a live concert 10, for example, the viewer selects various camera angles 100 at different times. These selections along with a time stamp, indicating the program time when each selection was made, are stored in memory 265. When the program is played back a second time, the processor 260 will automatically direct branching between the video channels according to the stored selections at the time stamp. In this manner, a music video can be created by the viewer.

The viewing experience can be further enlightening for the viewer by implementing games and contests during the live sporting event 10. For example, graphics overlays can be developed that query the viewer during the game. During a football broadcast, for example, viewers can be queried with such interrogatories as the following:

What will be the next play? (RUN/PASS/KICK);
Will the offense get the first down?;
Will they score on this possession?;
Pick the halftime score;
Who will win?

Each viewer's responses can be sent back to the control studio 5 for tabulation of scores. Preferably, the responses are packaged at the digital cable box 25 and transmitted to the control studio 5 via the digital backchannel upon the UPLOAD EXTENDED command. Alternatively, tabulation of scores can take place at the digital cable box 25 through the utilization of certain software in memory 265. Each correct answer can correspond to a certain number of points. At the end of the game, the interactive program preferably presents a graphic showing the viewer point total. If desired, advertisers could present special gift certificates for excellent performance in such games. The provision of such certificates would occur by displaying a certain code that a viewer can take to a store to receive the gift. In this manner, viewer interests in sports events can be enhanced.

Further, the viewer has the option with the present invention to block out viewing of certain events. For example, if the viewer is adverse to violence during a sporting event or other type program, the system can block out such options from the viewer with the following data commands:

EVENT

This command is used to indicate occurrence of a certain event (e.g., a fight breaking out during a football game).

EVENT EVENT_NUMBER
EVENT_NUMBER is a numeric constant.
ON EVENT EXECUTE MACRO

This command is used to implement certain actions (such as an automatic branch to another video channel in order to block out violent event, for example), as soon as the event arrives.

ON_EVENT EVENT_NUMBER MACRO_NUMBER
EVENT_NUMBER is a numeric constant.
MACRO_NUMBER is a numeric constant.

I. Two-Way Configuration

Figure 7:
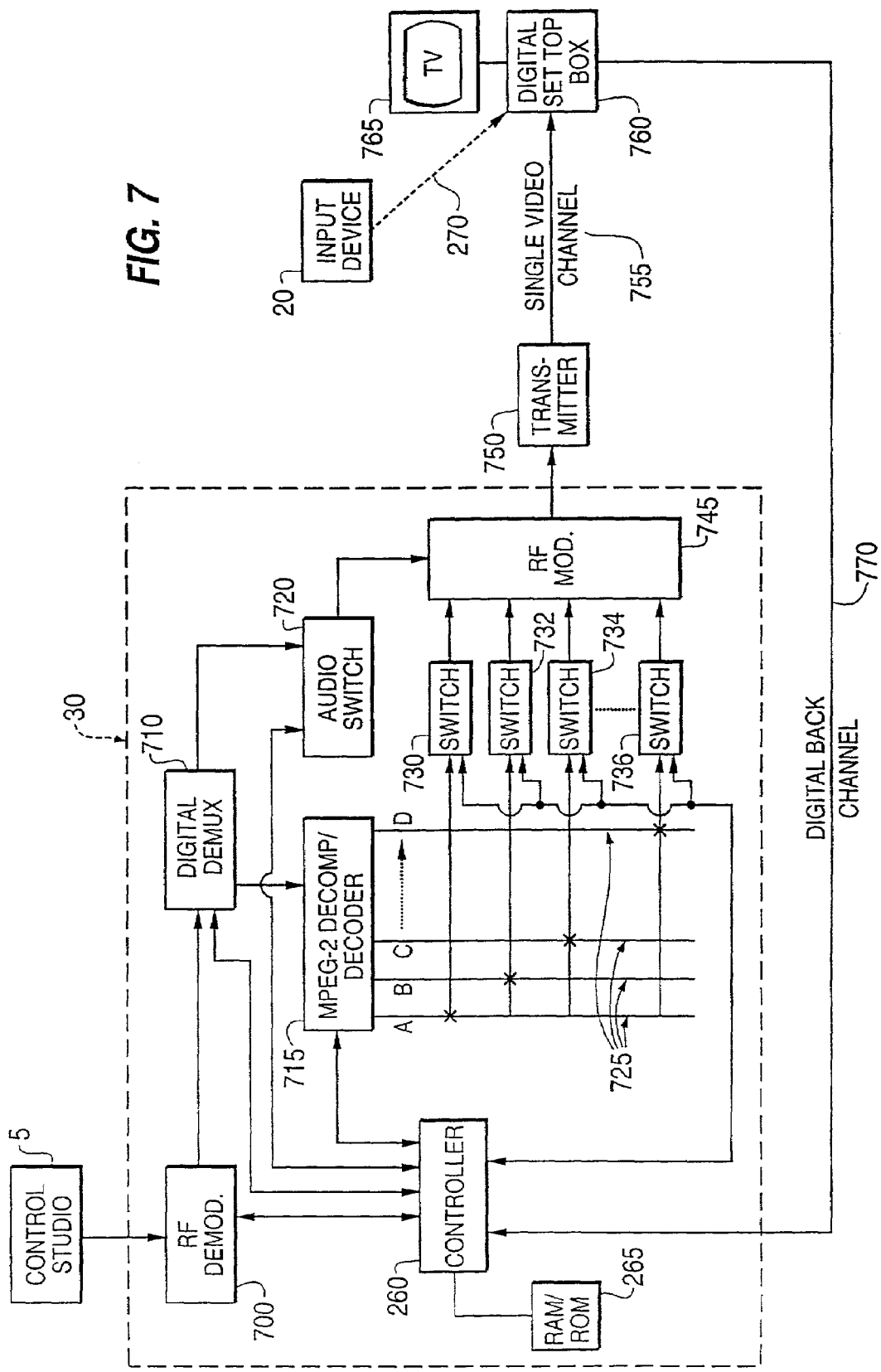
FIG. 7 is a block diagram of the two-way configuration of the system.

The live programming system of the present invention may be operated in a two way configuration, as illustrated in FIG. 7. In this mode, the various video signals are processed as previously described, being digitized and compressed at the control studio 5. The signals are then sent to a central switching station, or headend 30.

In this embodiment, the switching between the various live digital signals is accomplished at the headend 30 rather than at the receiver. On the receive end, each digital set-top box 760 relays viewer selections back to the remotely located switching station 30. Preferably, the viewer selections are relayed by way of the digital back channel 770. However, the viewer selections may be relayed to the switching station 30 by any conventional means, such as two-way cable television, telephone or microwave transmission. The switching station 30 receives the viewer selection and routes the desired signal to a transmitter 750 which conventionally transmits the desired video down the appropriate digital cable channel for the particular viewer.

At the central switching station 30, a demultiplexer 710 demultiplexes the compressed signals and places each on a separate bus channel 725. A number of remote control interactive switches 730, 732, 734, 736 are connected to the video signal bus 725. Based on the viewer selections, an algorithm stored in memory 265 and under processor 260 control at the central switching station 30, a digital seamless switch is made and the selected video, audio and/or graphics are forwarded to the viewer home for display.

Such a two-way embodiment could be implemented in a video dial tone or video server system. In such a system, only a single video channel 755 is necessary for each home. Once the viewer selection is received at the server site at the cable headend 30, a switch is made to the appropriate video stream and this stream is sent on the single channel 755 to the home.

Alternatively, it may be desirable to transmit an interactive sporting event over a single telephone line. When the viewer enters a selection on their remote 20, a signal is sent by way of the telephone line to the central switching station 30 which routes the desired signal of the interactive program over the user's telephone line so that a single link handles both the interactive choice being made at the receiver and the transmission of that choice from the headend 30 where the actual switching takes place in response to the interactive selection made at the receiver.

The two-way link between the viewer and switching station 30 may be used for other purposes. For example, demographic data may be transferred from the viewer to the broadcast network for commercial purposes, such as targeted advertising, billing, or other commercial or non-commercial purposes.

While the present invention has been described primarily with respect to live events, and in particular sporting events, it has equal potential for enhancing content in other program categories. A viewer can become their own director of a murder mystery or other drama. By entering responses to displayed questions at the initiation of or during the show, the program will branch to alternative video/audio segments as a result of the user selections. In this manner, different viewers with different selections may end up with a different murderer at the conclusion of the broadcast.

Using the foregoing embodiments, methods and processes, the interactive multimedia computer maximizes personalized attention and interactivity to subscribers in their homes in real time. Although the present invention has been described in detail with respect to certain embodiments and examples, variations and modifications exist which are within the scope of the present invention as defined in the following claims.

What is claimed is:

1. A television reception system for receiving live interactive programming, the live interactive programming comprising a plurality of digitally compressed video signals, the video signals further comprising at least a first video signal and a second video signal, the reception system comprising:

a tuner that receives and tunes a transmission signal carrying the plurality of video signals from a plurality of video cameras providing differentiable views of a live event, the tuner including a demodulator that demodulates the plurality of video signals as directed by a microprocessor;

an audio switcher that receives an audio signal associated with the live event;

a forward error correction unit that detects redundant data in the transmitted video signals and corrects errors in the transmitted video signals;

a demultiplexor that demultiplexes the plurality of video signals to obtain a first video signal, and that extracts graphics data and control data from the plurality of video signals, and that demultiplexes the audio signal;

a decompressor/decoder connected to the demultiplexor that decompresses and decodes the first video signal the extracted graphics data and control data;

a video synchronizer that receives the decompressed and decoded first video signal and the extracted graphics data and control data and synchronizes the decompressed and decoded first video signal and the extracted graphics data and control data;

a video frame buffer that holds the synchronized first video signal for a number of frames and delays output of the synchronized first video signal to allow the decompressor/decoder lock onto and decompress the second video signal and to wait for a vertical interval of the second video signal;

a viewer interface for receiving a viewer entry;

the microprocessor, connected to the viewer interface and the decompressor/decoder and the demodulator, the microprocessor directing demodulation of the demodulator and directing operation of the demultiplexor to perform a seamless switch from the first video signal to the second video signal in response to at least one of the received viewer entry and a control code; wherein the decompressor/decoder further decompresses and decodes the demultiplexed second video signal; and the microprocessor coordinates the decompressing and decoding of the first video signal, the holding of the first video signal in the video frame buffer by manipulating the fill and empty rate of the video frame buffer, and the decompressing and decoding of the second video signal such that the switch from the first video signal to the second video signal is imperceptible to a viewer as the first video signal is displayed as an output of the video frame buffer after the delay thereby masking the acquisition and decoding of the second video signal; and a means for displaying the first video signal and the second video signal.

2. A television reception system for receiving live interactive programming, the live interactive programming comprising a plurality of digitally compressed video signals, the video signals further comprising at least a first video signal and a second video signal, the reception system comprising:

a tuner that receives and tunes a transmission signal carrying the plurality of video signals from a plurality of video cameras providing differentiable views of a live event, the tuner including a demodulator that demodulates the plurality of video signals directed by a microprocessor;

an audio switcher that receives an audio signal associated with the live event;

a forward error correction unit that detects redundant data in the transmitted video signals and corrects errors in the transmitted video signals;

a demultiplexor that demultiplexes the plurality of video signals to obtain a first video signal, and that extracts graphics data and control data from the plurality of video signals, and that demultiplexes the audio signal;

a decompressor/decoder connected to the demultiplexor that decompresses and decodes the first video signal and the extracted graphics data and control data;

a video synchronizer that receives the decompressed and decoded first video signal and the extracted graphics data and control data and synchronizes the decompressed and decoded first video signal and the extracted graphics data and control data;

a video frame buffer that holds the synchronized first video signal for a number of frames and delays output the synchronized first video signal to allow the decompressor/decoder to lock onto and decompress the second video signal and to wait for a vertical interval of the second video signal;

a memory for storing a viewer profile;

the microprocessor, connected to the memory and the decompressor/decoder and the demodulator, the microprocessor directing demodulation of the demodulator and directing operation of the demultiplexor to perform a seamless switch from the first video signal to the second video signal in response to at least one of the stored viewer profile and a control code; wherein the decompressor/decoder further decompresses and decodes the demultiplexed second video signal; and the microprocessor coordinates the decompressing and decoding of the first video signal, the holding of the first video signal in the video frame buffer by manipulating the fill and empty rate of the video frame buffer, and the decompressing and decoding of the second video signal such that the switch from the first video signal to the second video signal is imperceptible to a viewer as the first video signal is displayed as an output of the video frame buffer after the delay thereby masking the acquisition and decoding of the second video signal; and a means for displaying the first video signal and the second video signal.

3. The television reception system as set forth in claim 1 or 2, wherein:

the live interactive programming further comprises at least one digitally compressed audio signal;

the transmission signal further carries the at least one audio signal;

the demultiplexor is provided further for demultiplexing the at least one audio signal;

the decompressor/decoder is provided further for decompressing and decoding the at least one audio signal; and the television reception system further comprises a means for playing the at least one audio signal.

4. The television reception system as set forth in claim 3, wherein the at least one audio signal further comprises at least a first audio signal and a second audio signal;

the microprocessor is provided further for directing a switch from the first audio signal to the second audio signal in response to at least one of a viewer input and the control code, wherein the microprocessor coordinates the decompressing and decoding of the first audio signal and the second audio signal.

5. The television reception system as set forth in claim 3, wherein the at least one audio signal is associated with at least one of the plurality of video signals.

6. The television reception system as set forth in claim 1 or 2, wherein the live interactive programming further comprises:

a graphics signal;

the transmission signal further comprises the graphics signal;

the demultiplexor is provided further for demultiplexing the graphics signal;

the decompressor/decoder is provided further for decompressing and decoding the graphics signal; and the means for displaying further comprises a means for displaying the graphics signal.

7. The television reception system as set forth in claim 1, wherein the live interactive programming further comprises an interrogatory, which requests the viewer to provide a response; and the viewer entry comprises the response to at least one interrogatory.

8. The television reception system as set forth in claim 7, wherein the response comprises a selection of one of the plurality of video signals for display.

9. The television reception system as set forth in claim 2 further comprising a viewer interface for receiving a viewer entry, and wherein the live interactive programming further comprises an interrogatory, which requests the viewer to provide a response; and the viewer entry comprises a response to at least one interrogatory, which response is stored in the memory as part of the viewer profile.

10. The television reception system as set forth in claim 1 or 2, wherein each of the plurality of digitally compressed video signals corresponds, respectively, to one of a plurality of different predetermined camera angles of a live event.

11. The television reception system as set forth in claim 1 or 2, wherein the transmission signal is carried over at least one of the transmission mediums selected from a group comprising: a satellite transmission system; a cable distribution system; a broadcast transmission system; the Internet; a private network; an in-stadium network.

12. The television reception system as set forth in claim 1 or 2, wherein the live interactive programming further comprises the control code;

the transmission signal further carries the control code;

the demultiplexor is provided further for demultiplexing the control code; and the decompressor/decoder is provided further for decompressing and decoding the control code.

13. The television reception system as set forth in claim 1 or 2, wherein the plurality of digitally compressed video signals are compressed based upon a predicated video frame compression scheme.

14. The television reception system as set forth in claim 1 or 2, wherein:

the live interactive programming further comprises an encoded information segment address, which specifies the location of an information segment;

the transmission signal further carries the encoded information segment address;

the demultiplexor is provided further for demultiplexing the encoded information segment address; and the decompressor/decoder is provided further for decompressing and decoding the encoded information segment address; and wherein the system further comprises a means for retrieving the information segment located at the information segment address; and the means for displaying displays the information segment simultaneously with or in replacement of the first video signal or the second video signal.

15. The television reception system as set forth in claim 14, wherein the information segment address is a uniform resource locator.

16. The television reception system as set forth in claim 14, wherein the information segment address specifies an entry in a database index accessible via a communication network.

17. The system as set forth in claim 1 or 2, wherein at least one of the plurality of video signals further comprises an encoded information segment address, which specifies the location of an information segment; and wherein the system further comprises a means for retrieving the information segment located at the information segment address; and the means for displaying displays the information segment simultaneously with or in replacement of the first video signal or the second video signal.

18. The television reception system as set forth in claim 17, wherein the information segment address is a uniform resource locator.

19. The television reception system as set forth in claim 17, wherein the information segment address specifies an entry in a database index accessible via a communication network.

20. A live interactive digital presentation system, said live interactive digital presentation system comprising:

a means for receiving live interactive programming from a digital program stream, the live interactive programming comprising a plurality of digital video signals from a plurality of video cameras providing differentiable views of a live event, the means for receiving including means for demodulating the digital program stream to obtain video signals as directed by a microprocessor, the video signals further comprising at least a first video signal and a second video signal;

an audio switcher that receives an audio signal associated with the live event;

a forward error correction unit that detects redundant data in the transmitted video signals and corrects errors in the transmitted video signals;

a demultiplexor that demultiplexes the plurality of video signals to obtain a first video signal, and that extracts graphics data and control data from the plurality of video signals, and that demultiplexes the audio signal;

a decompressor/decoder connected to the demultiplexor that decompresses and decodes the first video signal and the extracted graphics data and control data;

a video synchronizer that receives the decompressed and decoded first video signal and the extracted graphics data and control data and synchronizes the decompressed and decoded first video signal and the extracted graphics data and control data;

a video frame buffer that holds the synchronized first video signal for a number of frames and delays output of the synchronized first video signal to allow the decompressor/decoder to lock onto and decompress the second video signal and to wait for a vertical interval of the second video signal;

a viewer interface for receiving a viewer entry;

the microprocessor, connected to the viewer interface and the means for receiving and the means for demodulating the digital program stream, the microprocessor directing demodulation of the digital program stream and directing operation of the demultiplexor to perform a seamless switch from the first video signal to the second video signal in response to at least one of the received viewer entry and a control code; wherein, the decompressor/decoder further decompresses and decodes the demultiplexed second video signal: and the microprocessor coordinates the decompressing and decoding of the first video signal, the holding of the first video signal in the video frame buffer by manipulating the fill and empty rate of the video frame buffer, and the decompressing and decoding of the second video signal such that the switch from the first video signal to the second video signal is imperceptible to a viewer as the first video signal is displayed as an output of the video frame buffer after the delay thereby masking the acquisition and decoding of the second video signal; and a means for displaying the first video signal and the second video signal.

21. The interactive digital presentation system as set forth in claim 20, wherein the live interactive programming further comprises at least one digital audio signal; and the system further comprises a means for playing the at least one digital audio signal.

22. The interactive digital presentation system as set forth in claim 21, wherein the at least one digital audio signal further comprises at least a first audio signal and a second audio signal; and the microprocessor is provided further for directing a switch from the first audio signal to the second audio signal in response to at least one of the received viewer entry and the control code.

23. The interactive digital presentation system as set forth in claim 20, wherein the live interactive programming further comprises a graphics signal; and the means for displaying further comprises a means for displaying the graphics signal.

24. The interactive digital presentation system as set forth in claim 20, wherein the digital program stream is received by the means for receiving over a transmission medium selected from a group comprising: satellite transmission system; a cable distribution system; a broadcast transmission system; the Internet; a private network; an in stadium network.

25. The interactive digital presentation system as set forth in claim 20, wherein the system is embodied within a computer workstation.

26. The interactive digital presentation system as set forth in claim 20, wherein each of the plurality of digital video signals corresponds, respectively, to one of a plurality of different predetermined camera angles of a live event.

27. The interactive digital presentation system as set forth in claim 20, wherein one of the plurality of digital video signals corresponds to a main program video feed.

28. The interactive digital presentation system as set forth in claim 21, wherein the at least one digital audio signal comprises a plurality of digital audio signals; and each of the plurality of digital video signals corresponds, respectively, to one of the plurality of digital audio signals.

29. The interactive digital presentation system as set forth in claim 20 further comprising:

a means for decoding, connected to the means for receiving, an encoded information segment address, wherein the live interactive programming further comprises encoded information segment address, and the information segment address specifies the location of an information segment; and a means for retrieving, connected to the means for decoding, the information segment located at the information segment address; and wherein the means for displaying displays the information segment simultaneously with or in replacement of the first video signal or the second video signal.

30. The interactive digital presentation system as set forth in claim 29, wherein the information segment address comprises a uniform resource locator.

31. The interactive digital presentation system as set forth in claim 29, wherein the information segment address specifies an entry in a database index accessible via a communication network.

32. The interactive digital presentation system as set forth in claim 29, wherein the information segment address is encoded in a portion of at least one of the plurality of video signals.

33. A method for providing live interactive digital programming, the live interactive digital programming comprising a plurality of digitally compressed, multiplexed video signals, the plurality of video signals further comprising a first video signal and a second video signal, the method comprising:

receiving the live interactive digital programming from a plurality of video cameras providing differentiable views of a live event into a demodulator;

demodulating the plurality of video signals as directed by a microprocessor;

forward error correcting the plurality of demodulated video signals;

demultiplexing the plurality of demodulated video signals to create a first time-multiplexed video signal and a second time-multiplexed video signal on separate channels and to extract graphics data and control data from the plurality of demodulated video signals;

decompressing and decoding, in a decompressor/decoder device, the demultiplexed first and second time-multiplexed video signals and the extracted graphics data and control data from the plurality of demodulated video signals;

synchronizing the decompressed and decoded first video signal and the extracted graphics data and control data;

buffering the synchronized first video signal for a number of frames and delaying the output of the synchronized first video signal;

presenting the decompressed first video signal to a viewer;

obtaining a viewer input;

selecting the second video signal based on the viewer input; commanding a demodulator to switch from the first video signal to the second video signal;

inserting a local sync and a frame sync to the second video signal to synchronize the second video signal with the first video signal;

directing a seamless switch during a vertical blanking interval of the first video signal to select the second video signal and select a second audio signal, whereby the buffering of the first video signal is the result of manipulating a fill and an empty rate of a video frame buffer, and the decompressing, decoding, and demodulation of the second video signal is such that the switch from the first video signal to the second video signal is imperceptible to a viewer; and presenting the second video signal to the viewer.

34. The method for providing live interactive digital programming as set forth in claim 33, said method further comprising:

obtaining viewer specific information;

creating a viewer profile with the viewer specific information; and wherein the step of selecting is further based, at least in part, on the viewer profile.

35. The method for providing live interactive digital programming as set forth in claim 34, said method further comprising:

storing the viewer profile in a database.

36. The method for providing live interactive digital programming as set forth in claim 34, wherein the obtaining viewer specific information further comprises:
presenting an interrogatory to the viewer, wherein the interrogatory requests the viewer to select a desired programming option;
collecting a response to the interrogatory from the viewer wherein the response comprises the viewer input.

37. The method for providing live interactive digital programming as set forth in claim 33, 34, or 36, wherein the selecting is further based, at least in part, upon a control code.

38. The method for providing live interactive digital programming as set forth in claim 37, wherein live interactive digital programming further comprises the control code.

39. The method for providing live interactive digital programming as set forth in claim 33, wherein:
the live interactive digital programming further comprises at least one digital audio signal;
the step of demultiplexing further comprises demultiplexing the digital audio signal; and
the step of decompressing further comprises decompressing the demultiplexed digital audio signal; and wherein
the method further comprises presenting the digital audio signal to a viewer.

40. The method for providing live interactive digital programming as set forth in claim 39, wherein:
the at least one digital audio signal further comprises at least a first audio signal and a second audio signal;
the step of selecting is further based, at least in part, upon a control code; and
the method further comprises switching from the first audio signal to the second audio signal in response to at least one of the viewer input and the control code.

41. The method for providing live interactive digital programming as set forth in claim 33, wherein:
the live interactive digital programming further comprises a graphics signal;
the step of demultiplexing further comprises demultiplexing the graphics signal; and
the step of decompressing further comprises decompressing the demultiplexed graphics signal; and wherein
the method further comprises presenting the graphics signal to a viewer.

42. The method for providing live interactive digital programming as set forth in claim 33, wherein the live interactive digital programming further comprises an information segment address, and the method further comprises:
decoding the information segment address; and
retrieving the related information segment at the information segment address.

43. The method for providing live interactive digital programming as set forth in claim 42, wherein the information segment address comprises a uniform resource locator.

44. The system method for providing live interactive digital programming as set forth in claim 42, wherein the information segment address specifies an entry in a database index accessible via a communication network.

45. A method for providing live interactive digital programming, the live interactive digital programming comprising a plurality of digitally compressed, multiplexed video signals, the plurality of video signals further comprising a first video signal and a second video signal, the method comprising:
receiving the live interactive digital programming into a demodulator to create demodulated video signals;
forward error correcting the demodulated video signals;
demultiplexing the demodulated video signals to create a time-multiplexed first video signal;
storing the time-multiplexed first video signal in a memory to create a composite first video signal;
directing a pointer at a segment of the composite first video signal in said memory;
decompressing the segment of the composite first video signal to create a decompressed first video segment;
forwarding the decompressed first video segment to a display device;
obtaining a viewer input;
selecting the second video signal based on the viewer input;
directing a demodulator to switch from the first video signal to the second video signal;
instructing a demultiplexor to provide the second video signal to the memory;
filling the memory with frames from the second video signal;
moving the pointer to a beginning frame of the second video signal;
outputting the frames of the second video signal from the memory to a decompressor;
multiplexing the decompressed frames from the second video signal into identifiable packets
sending codes that link program elements and information segments of the first video signal and the second video signal;
synchronizing the second video signal to the first video signal;
directing a synchronous switch between the first video during a vertical blanking interval of the first video signal to select the second video signal and a second audio signal, whereby the switch from the first video signal to the second video signal is imperceptible to a viewer; and
presenting the second video signal to the viewer.

* * * * *